US011807153B2

(12) United States Patent
Keller et al.

(10) Patent No.: US 11,807,153 B2
(45) Date of Patent: Nov. 7, 2023

(54) MODULAR SYSTEMS AND METHODS FOR TRANSPORTING TOWER ASSEMBLY OF WIND TURBINE

(71) Applicant: BNSF Logistics, LLC, Dallas, TX (US)

(72) Inventors: Evan Keller, Houston, TX (US); Marco A. Poisler, Houston, TX (US); Joseph M. Sindelar, Houston, TX (US)

(73) Assignee: BNSF Logistics, LLC, Dallas, TX (US)

( * ) Notice: Subject to any disclaimer, the term of this patent is extended or adjusted under 35 U.S.C. 154(b) by 0 days.

(21) Appl. No.: 16/934,517

(22) Filed: Jul. 21, 2020

(65) Prior Publication Data

US 2021/0170936 A1 Jun. 10, 2021

Related U.S. Application Data

(63) Continuation of application No. 15/603,172, filed on May 23, 2017, now Pat. No. 10,752,154, which is a (Continued)

(51) Int. Cl.
*F03D 13/40* (2016.01)
*B60P 3/40* (2006.01)
(Continued)

(52) U.S. Cl.
CPC ............ *B60P 3/40* (2013.01); *B61D 3/166* (2013.01); *B61D 45/003* (2013.01); *E04H 12/00* (2013.01);
(Continued)

(58) Field of Classification Search
CPC . B60P 3/40; F03D 13/40; B61D 3/166; B61D 45/003
(Continued)

(56) References Cited

U.S. PATENT DOCUMENTS 600,428 A 3/1898 Ladd et al.
751,366 A 2/1904 Abernathy
(Continued)

FOREIGN PATENT DOCUMENTS

DE 2355628 A1 * 8/1974 ............. B60P 3/035
DE 3514975 A1 10/1986
(Continued)

OTHER PUBLICATIONS

AIMU Techical Services Committee, "Wind Turbine Paper," Jan. 2012.
(Continued)

*Primary Examiner* — Hilary L Gutman
(74) *Attorney, Agent, or Firm* — WHITAKER CHALK SWINDLE & SCHWARTZ PLLC; Enrique Sanchez, Jr.

(57) ABSTRACT

A system and method are used for transporting a plurality of tower sections of a wind turbine on beds of transport devices, such as flat railcars. Supports affix at support locations on beds to accommodate at least one of the tower sections on each of the transport devices. The supports can include bed supports, such as tabs, extending from the beds, and can include cradle supports with slots that engage on the tabs. A circumferential dimension of a cradle is adjusted on each of the supports against which the tower section rests. Each of the tower sections is then supported with at least two of the supports by loading the tower sections on the transport devices. An end of each of the tower sections is then affixed to a flange on at least one of the supports on each of the transport devices.

33 Claims, 32 Drawing Sheets

Related U.S. Application Data continuation-in-part of application No. 15/057,765, filed on Mar. 1, 2016, now Pat. No. 9,683,546.

(60) Provisional application No. 62/261,183, filed on Nov. 30, 2015.

(51) Int. Cl.
| | |
|---|---|
| *E04H 12/00* | (2006.01) |
| *E04H 12/34* | (2006.01) |
| *B61D 3/16* | (2006.01) |
| *B61D 45/00* | (2006.01) |

(52) U.S. Cl.
CPC ........... *E04H 12/344* (2013.01); *F03D 13/40* (2016.05); *F05B 2240/122* (2013.01); *F05B 2240/912* (2013.01); *Y02E 10/728* (2013.01)

(58) Field of Classification Search
USPC ......................................................... 410/44
See application file for complete search history.

(56) References Cited

U.S. PATENT DOCUMENTS

| | | | | |
|---|---|---|---|---|
| 901,815 | A | | 10/1908 | McConnell |
| 1,020,012 | A | * | 3/1912 | Anlauf et al. ....... B61D 45/003 |
| | | | | 105/385 |
| 2,411,900 | A | | 12/1946 | Seward |
| 2,611,495 | A | | 9/1952 | Weaver |
| 2,725,241 | A | | 11/1955 | Leonard, Jr. |
| 3,001,679 | A | * | 9/1961 | Canning ............... B60P 3/1008 |
| | | | | 224/324 |
| 3,018,129 | A | | 1/1962 | Culver |
| 3,061,255 | A | | 10/1962 | Gallo et al. |
| 3,232,636 | A | | 2/1966 | Buchanan et al. |
| 3,299,989 | A | | 1/1967 | Santosuosso |
| 3,387,813 | A | * | 6/1968 | Carino ..................... B60P 7/12 |
| | | | | 410/50 |
| 3,922,004 | A | | 11/1975 | Chamberlain |
| 4,102,274 | A | * | 7/1978 | Feary ..................... B60P 3/035 |
| | | | | 410/102 |
| 4,106,735 | A | | 8/1978 | Partain et al. |
| 4,219,229 | A | | 8/1980 | Ciocan |
| 4,653,967 | A | | 3/1987 | Isaksson et al. |
| 4,732,528 | A | | 3/1988 | Good |
| 5,076,745 | A | * | 12/1991 | Klein ................... B61D 45/003 |
| | | | | 410/94 |
| 5,193,700 | A | | 3/1993 | Scott et al. |
| 5,425,608 | A | | 6/1995 | Reitnouer |
| 5,579,698 | A | * | 12/1996 | Lis ........................... B61D 3/16 |
| | | | | 105/176 |
| 5,836,605 | A | | 11/1998 | Bowling |
| 5,888,039 | A | | 3/1999 | Cooley |
| 5,947,665 | A | | 9/1999 | Baur et al. |
| 5,954,465 | A | | 9/1999 | Ellerbush |
| 6,113,326 | A | | 9/2000 | Nicholson |
| 6,286,435 | B1 | | 9/2001 | Kassab et al. |
| 6,543,368 | B1 | | 4/2003 | Forbes |
| 7,040,846 | B2 | | 5/2006 | Couto |
| 7,210,882 | B2 | | 5/2007 | Andersen et al. |
| 7,591,621 | B1 | | 9/2009 | Landrum et al. |
| 7,775,753 | B2 | | 8/2010 | Pedersen et al. |
| 8,382,407 | B1 | | 2/2013 | Landrum et al. |
| 8,491,239 | B2 | * | 7/2013 | Ferrari ..................... B60P 3/035 |
| | | | | 410/49 |
| 8,500,378 | B1 | | 8/2013 | Landrum et al. |
| 8,506,218 | B2 | | 8/2013 | Delgado et al. |
| 8,529,174 | B1 | | 9/2013 | Landrum et al. |
| 8,690,140 | B2 | | 4/2014 | Rasmussen et al. |
| 8,708,625 | B1 | | 4/2014 | Landrum et al. |
| 8,967,930 | B2 | | 3/2015 | Jespersen |
| 9,683,546 | B1 | | 6/2017 | Keller et al. |
| 9,701,236 | B2 | | 7/2017 | Thomsen et al. |
| 10,041,479 | B2 | | 8/2018 | Pedersen et al. |
| 10,066,606 | B2 | * | 9/2018 | Thomsen ................ F03D 13/40 |
| 10,138,649 | B2 | | 11/2018 | Pedersen et al. |
| 10,995,735 | B1 | * | 5/2021 | Sullivan ................. F03D 13/40 |
| 2005/0002749 | A1 | * | 1/2005 | Andersen ............. B65D 88/022 |
| | | | | 410/82 |
| 2007/0036627 | A1 | | 2/2007 | Wright et al. |
| 2011/0097171 | A1 | | 4/2011 | Landrum et al. |
| 2011/0176904 | A1 | | 7/2011 | Stiesdal |
| 2017/0210395 | A1 | * | 7/2017 | Landrum ............... B61D 3/166 |
| 2021/0277875 | A1 | * | 9/2021 | Ferris ....................... B61D 3/08 |

FOREIGN PATENT DOCUMENTS

| | | | |
|---|---|---|---|
| DE | 202011003305 U | 9/2011 | |
| DE | 102012221937 A1 | 6/2013 | |
| DE | 102012018575 A1 * | 3/2014 | ............... B60P 3/40 |
| DE | 202014000615 U | 7/2014 | |
| EP | 0318960 A1 | 6/1989 | |
| EP | 0382587 A1 | 8/1990 | |
| EP | 2206627 A2 * | 7/2010 | ............... B60P 7/12 |
| EP | 2626547 A1 | 8/2013 | |
| FR | 2641505 A1 * | 7/1990 | ............... B60P 7/12 |
| FR | 2913380 A1 | 9/2008 | |
| JP | 4999116 B2 | 8/2012 | |
| WO | 2012003831 A2 | 1/2012 | |
| WO | 2014111093 A1 | 7/2014 | |
| WO | 2015101375 A1 | 7/2015 | |

OTHER PUBLICATIONS

BNSF Railway, "Wind Power Shipments on the BNSF Network," Brochure, Dec. 2015.
Int'l Search Report and Written Opinion in counterpart PCT Appl. PCT/US2016/064011, dated Feb. 2, 2017, 7-pgs.

\* cited by examiner

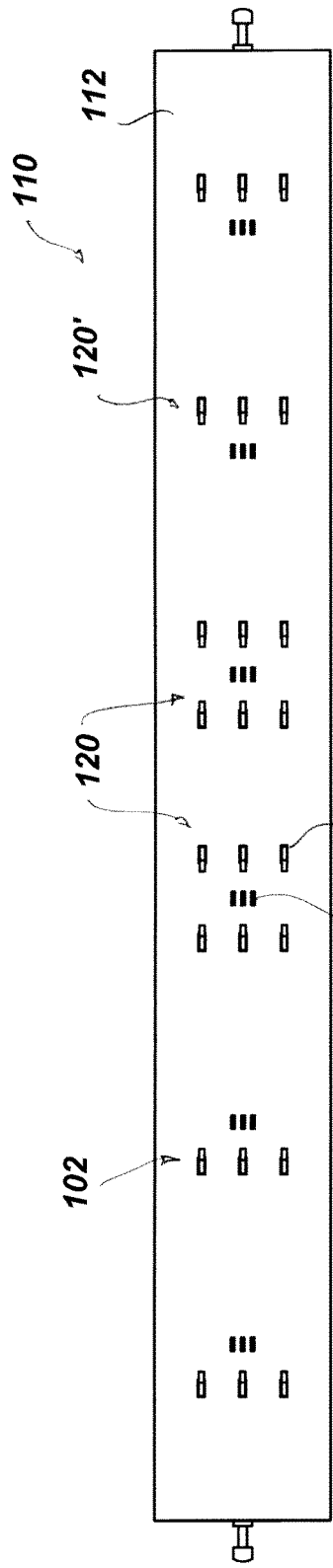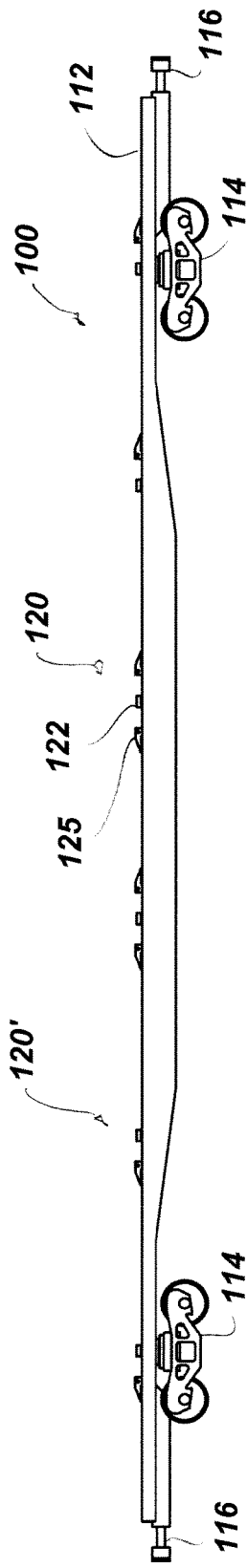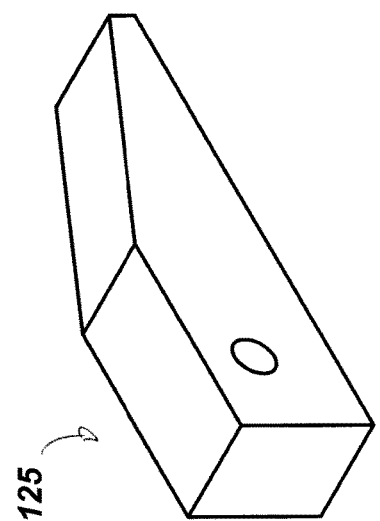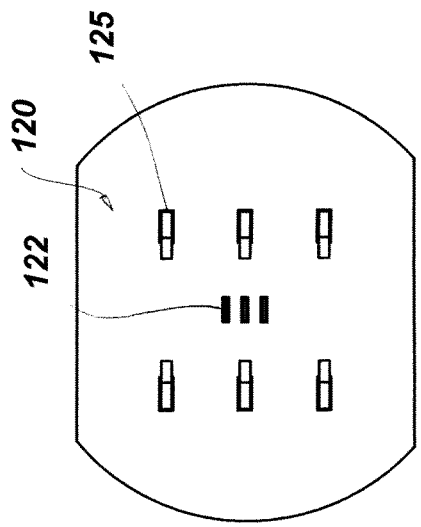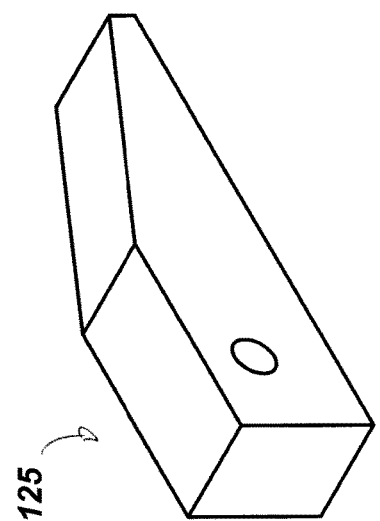

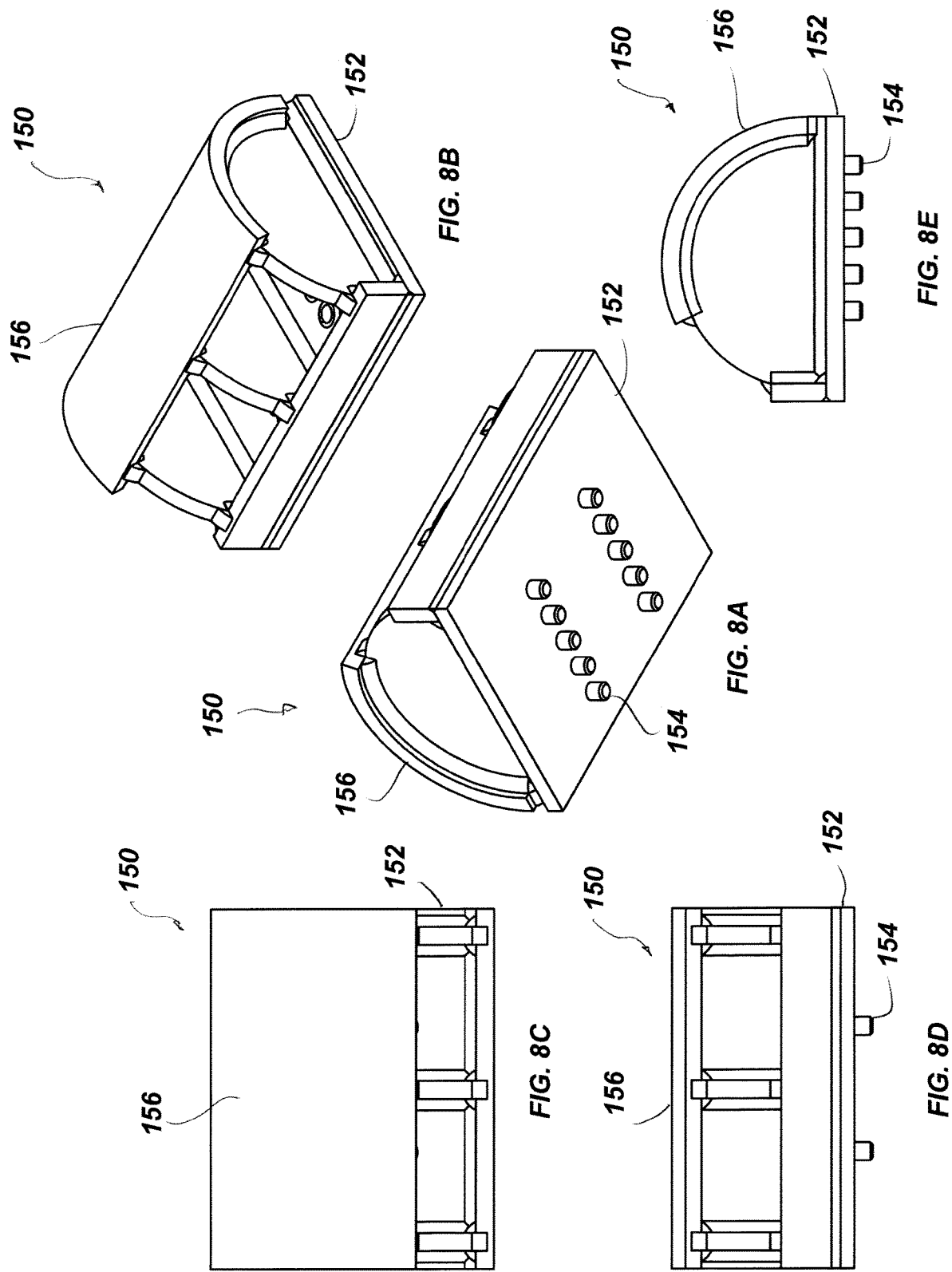

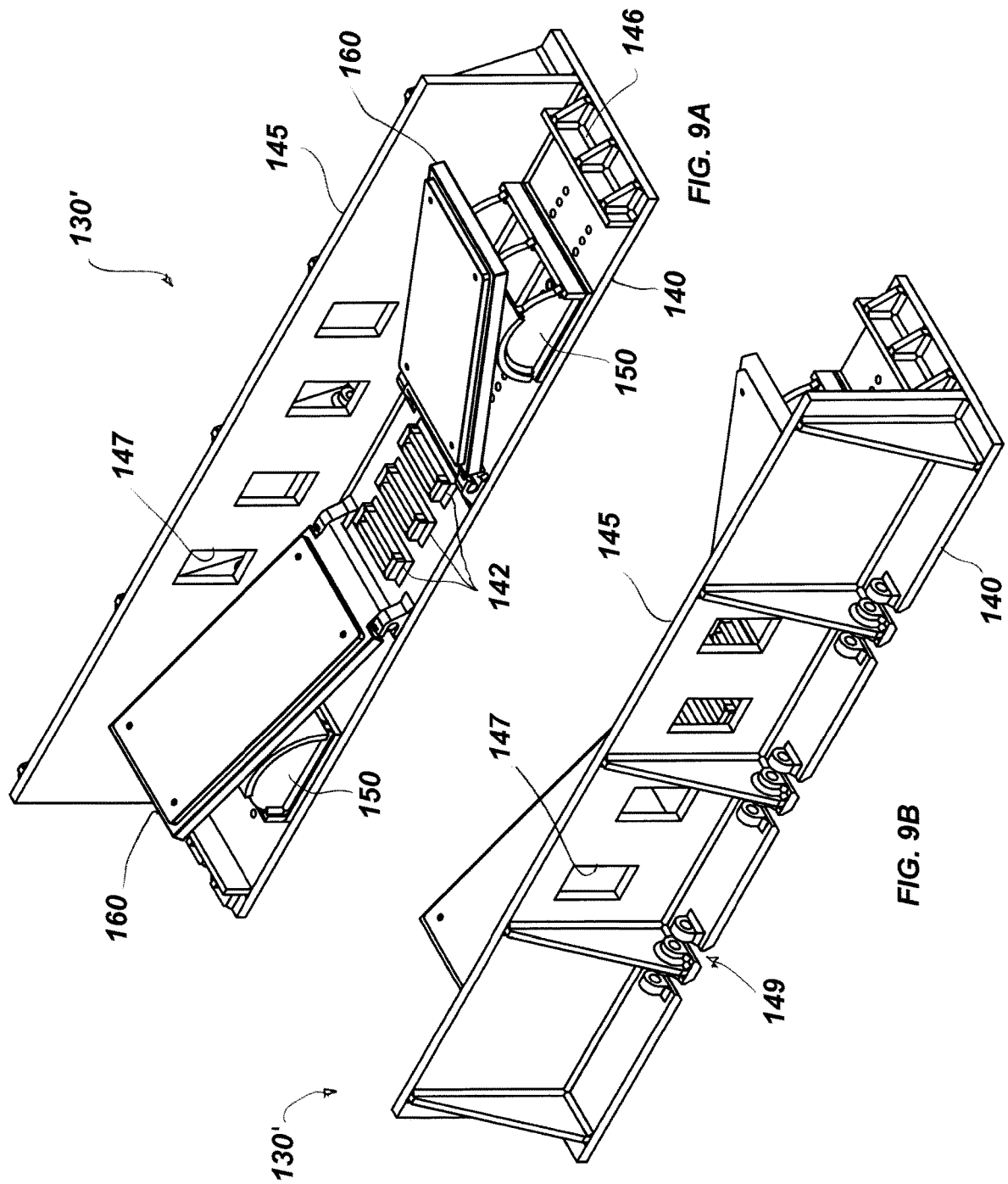

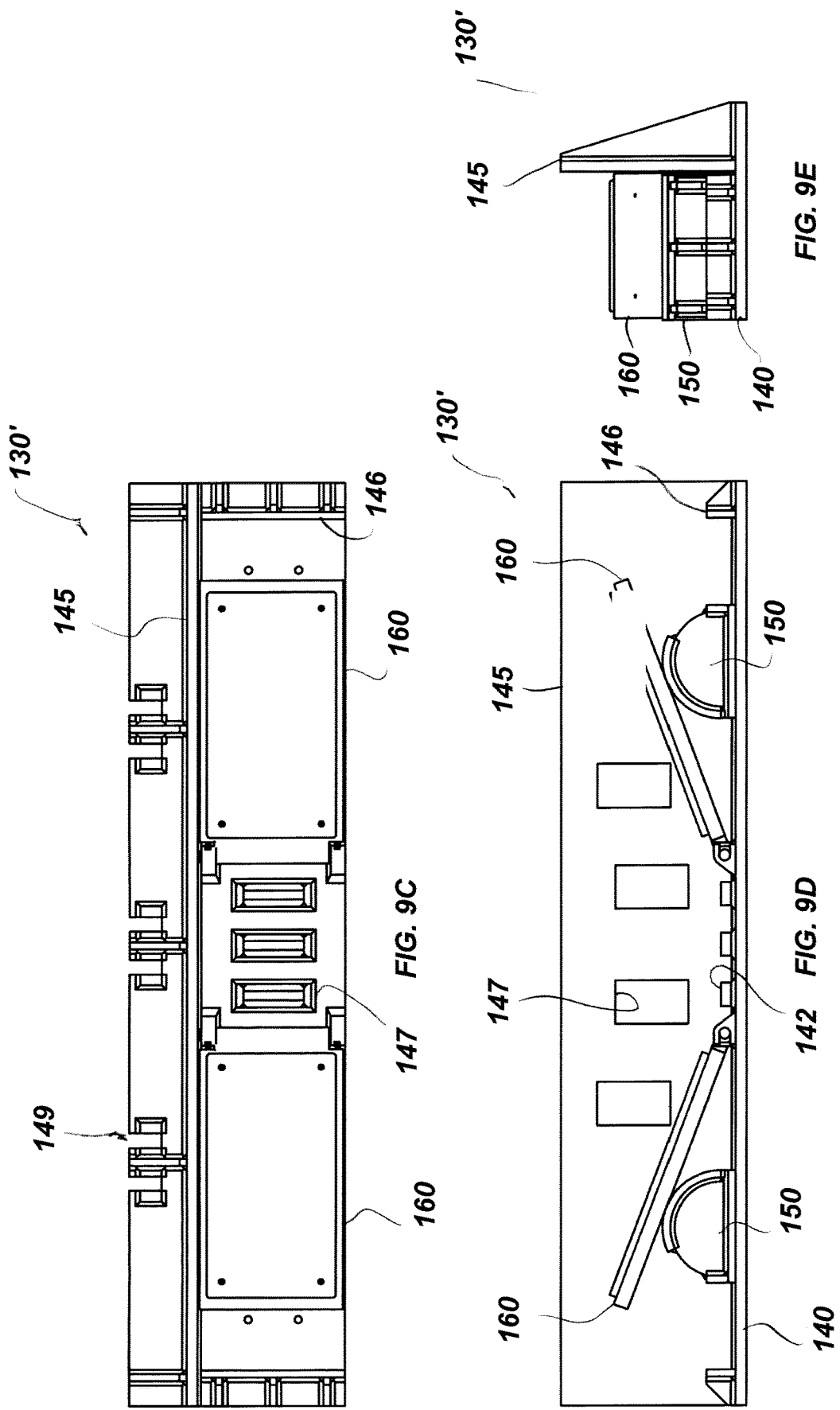

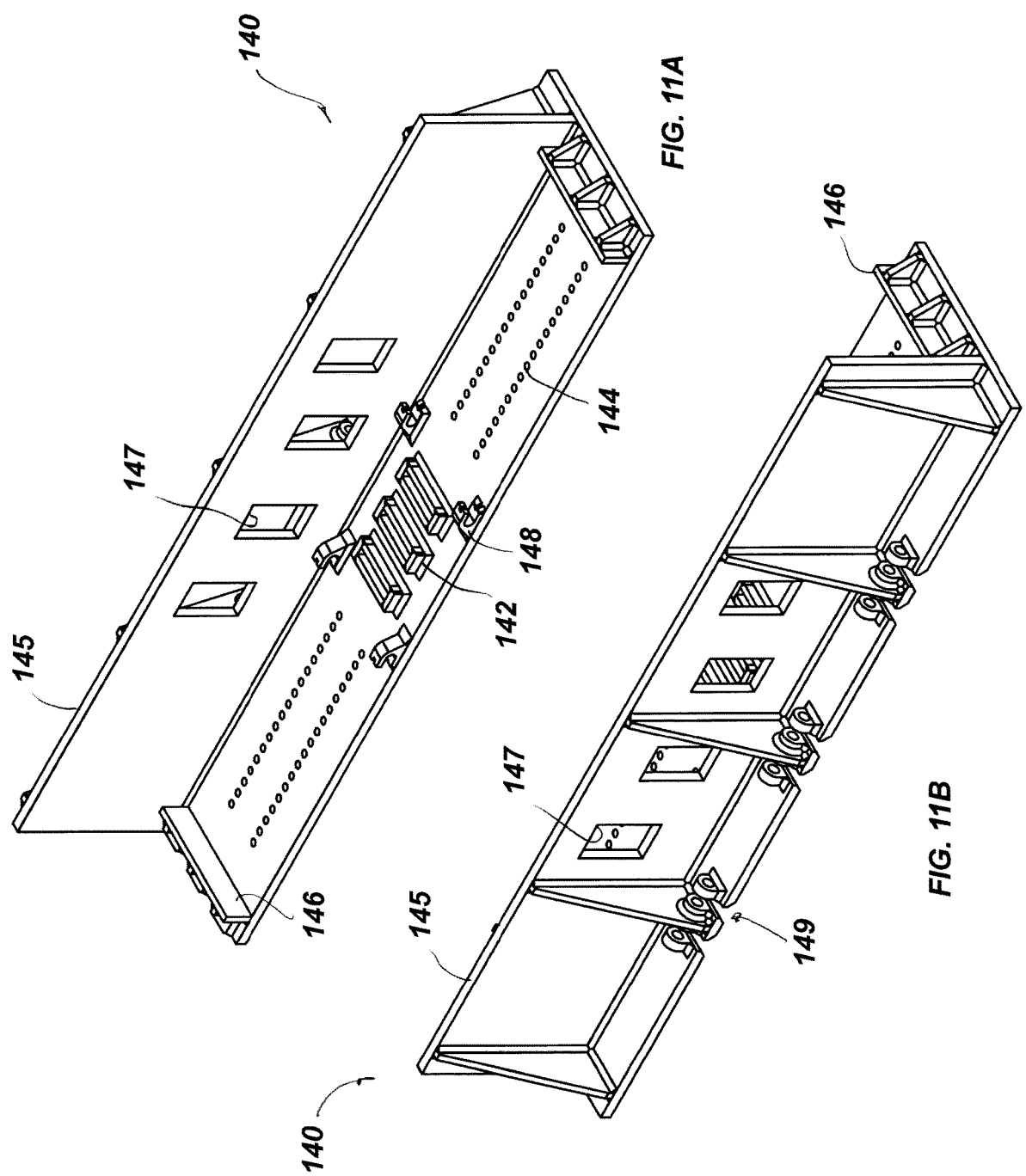

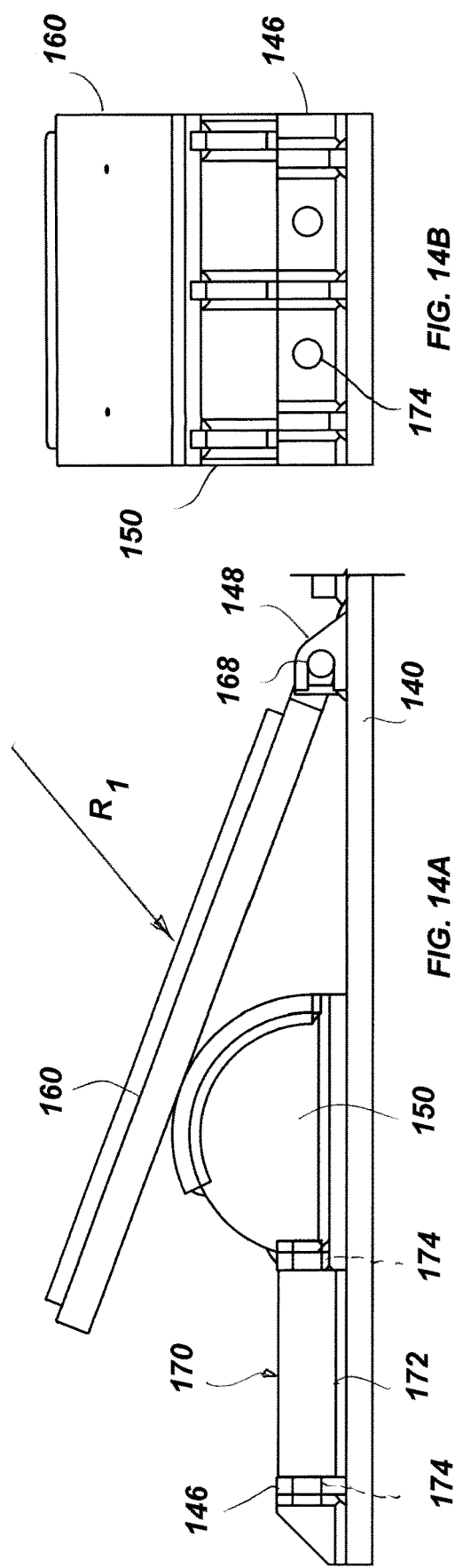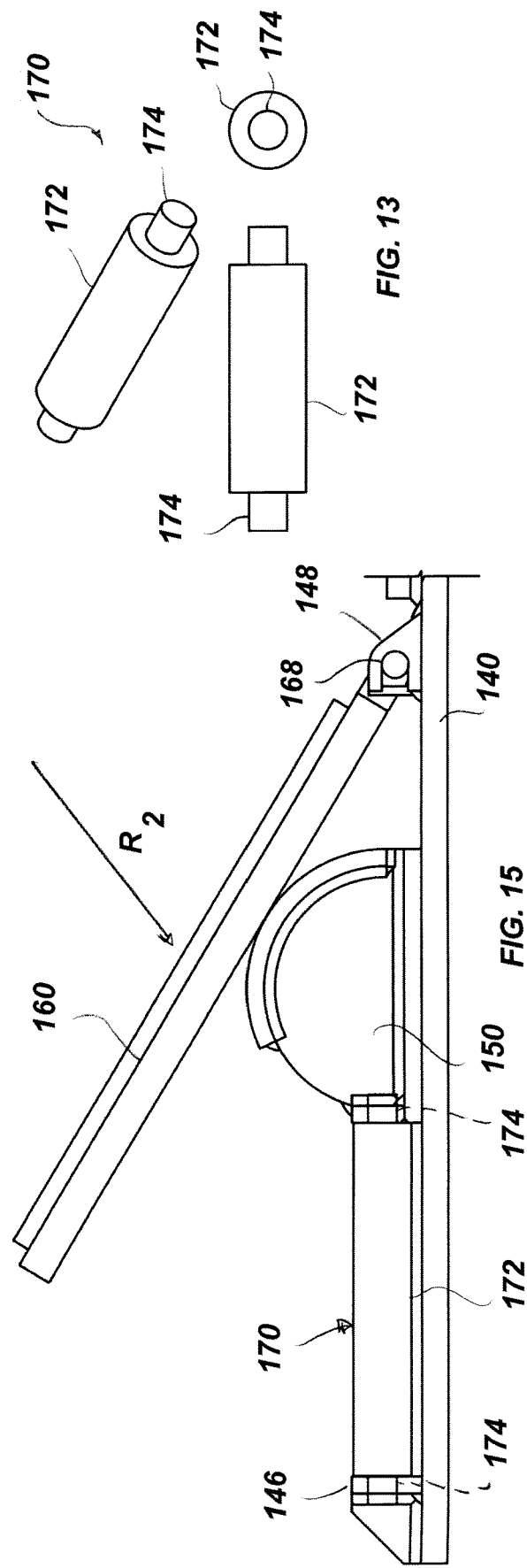

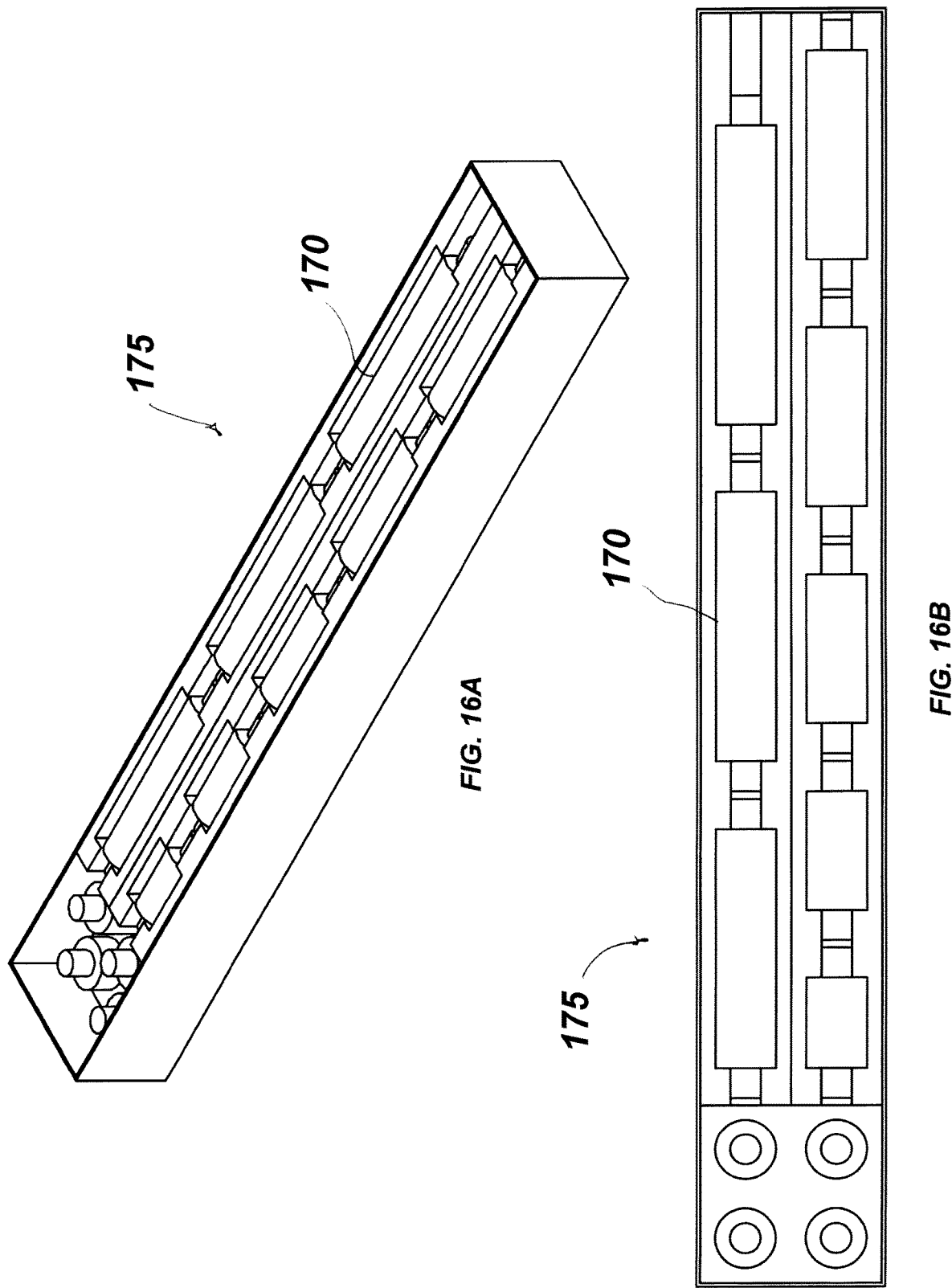

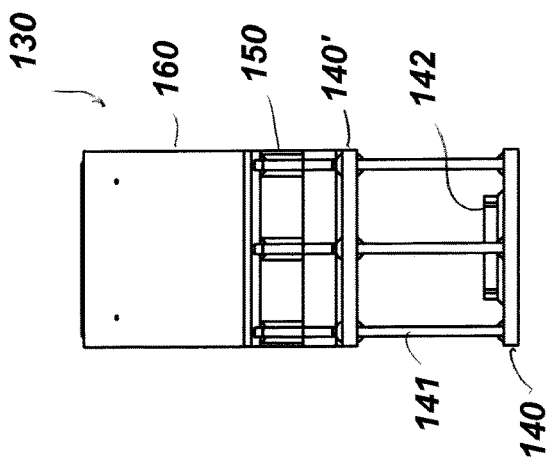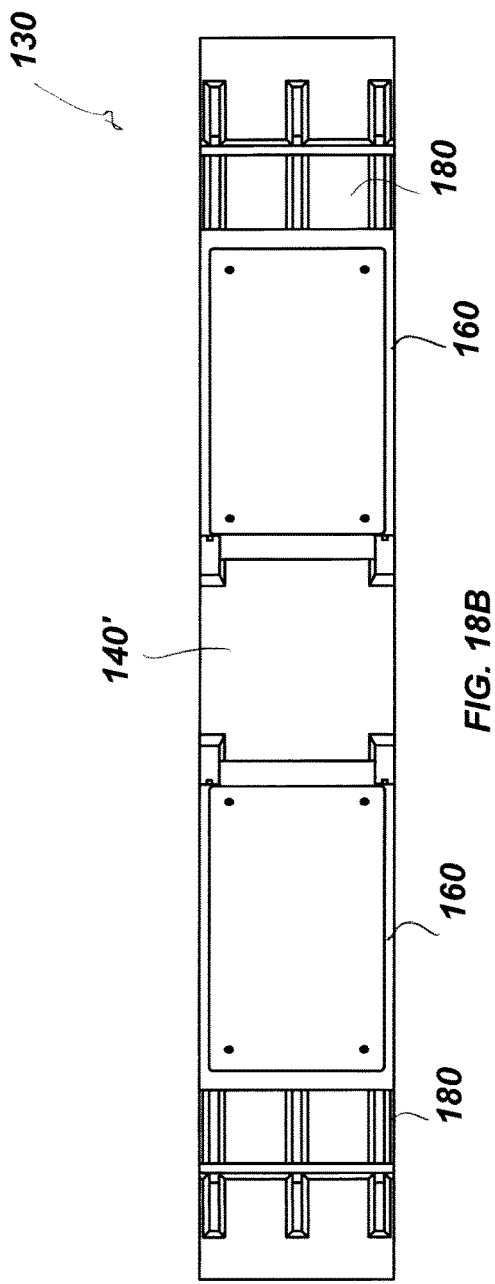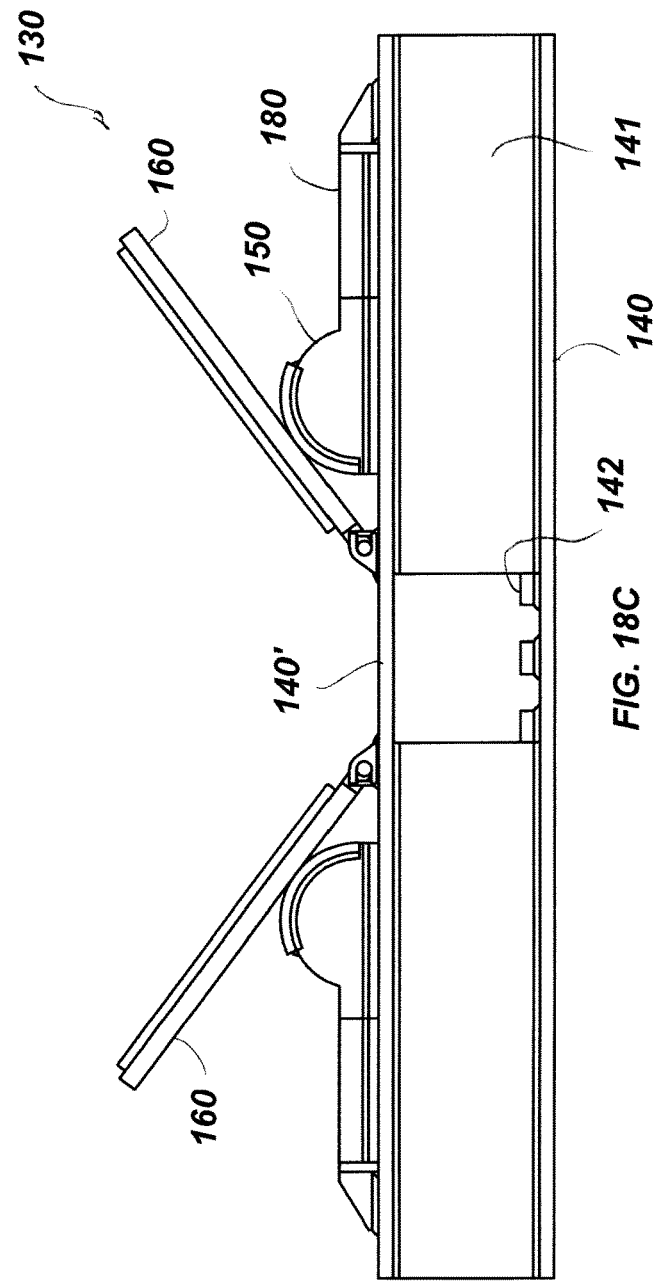

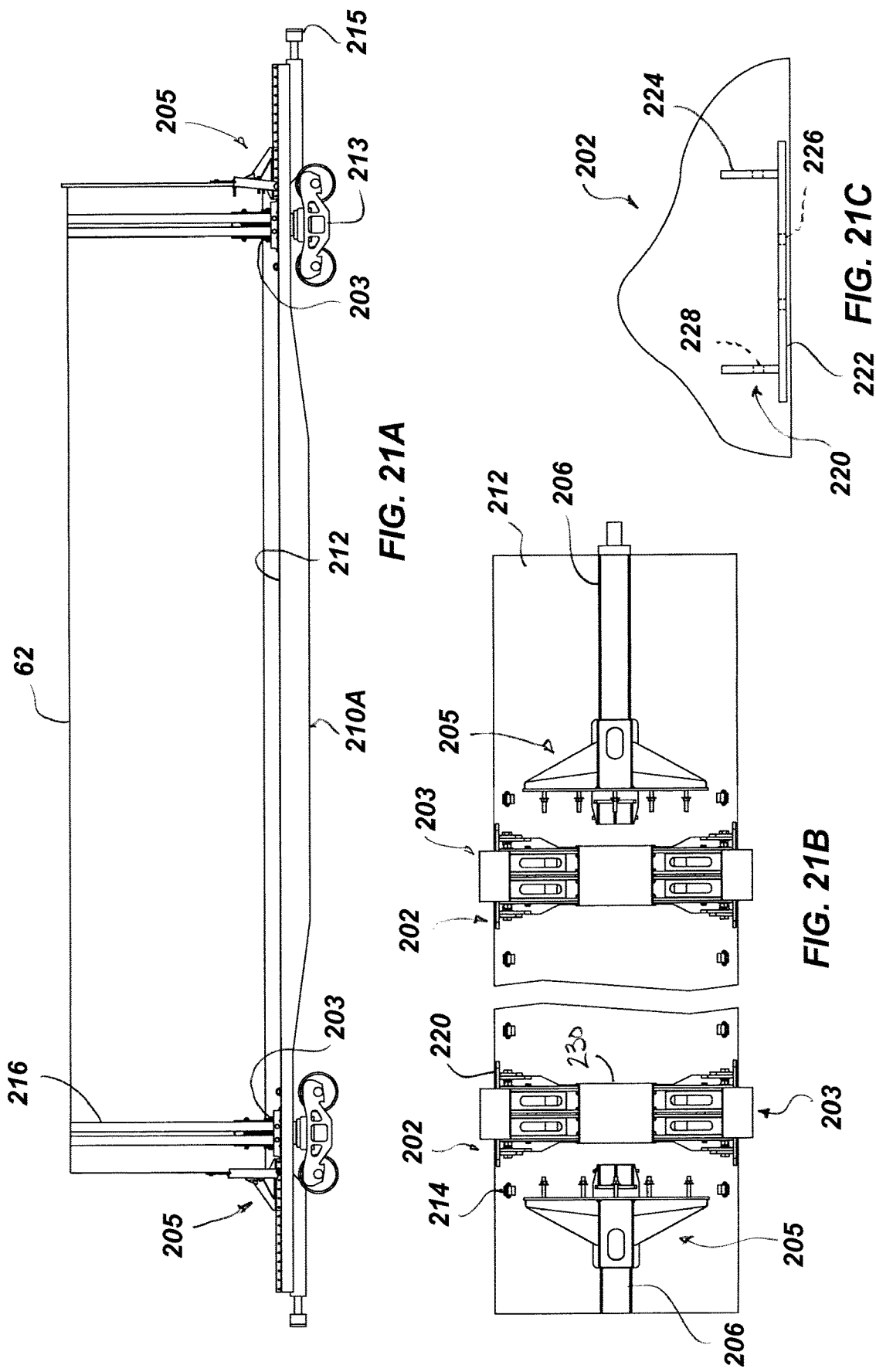

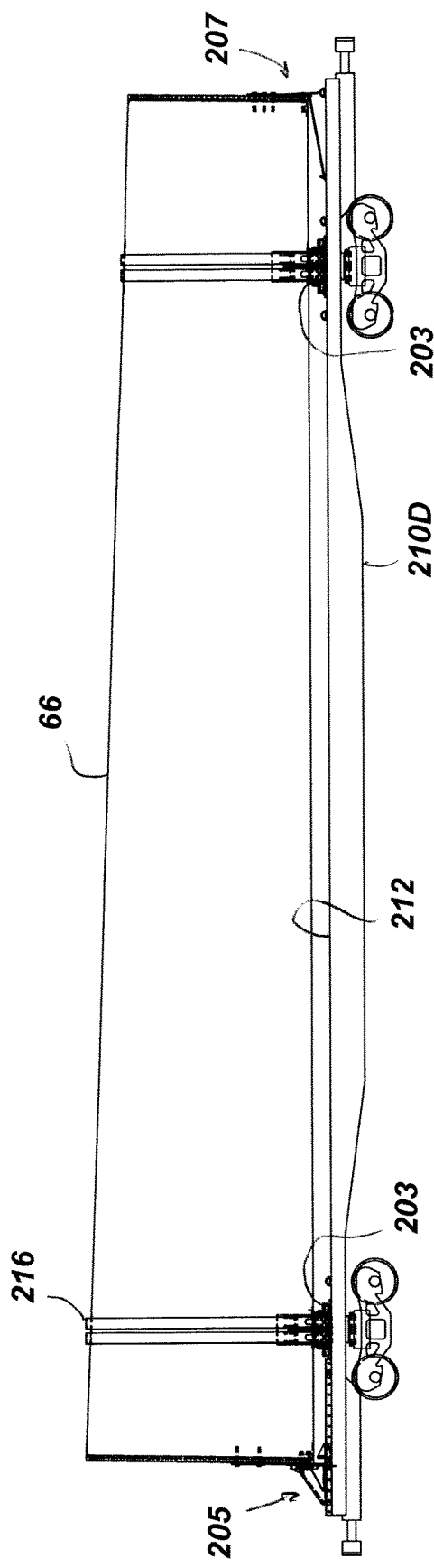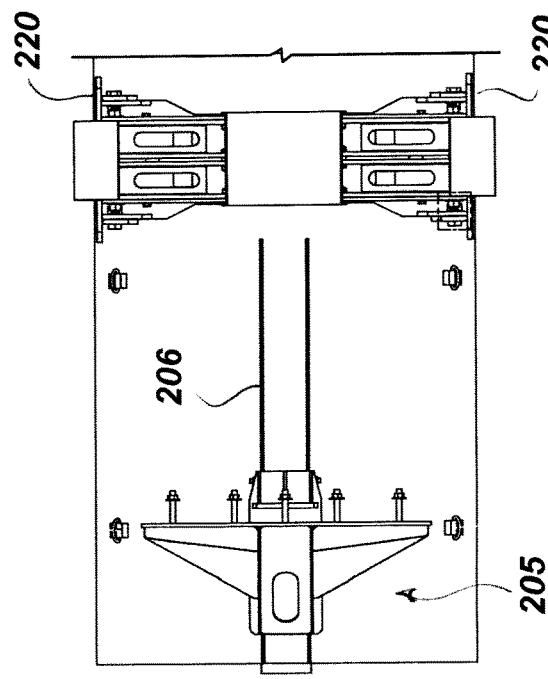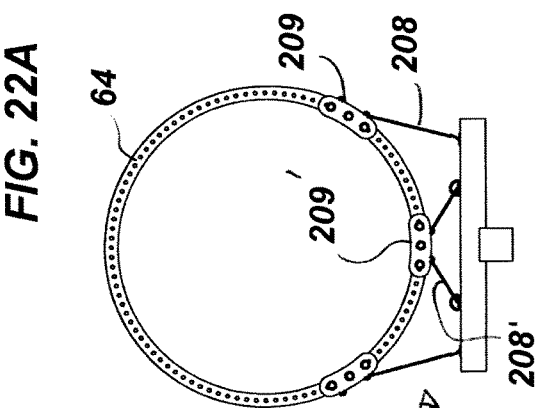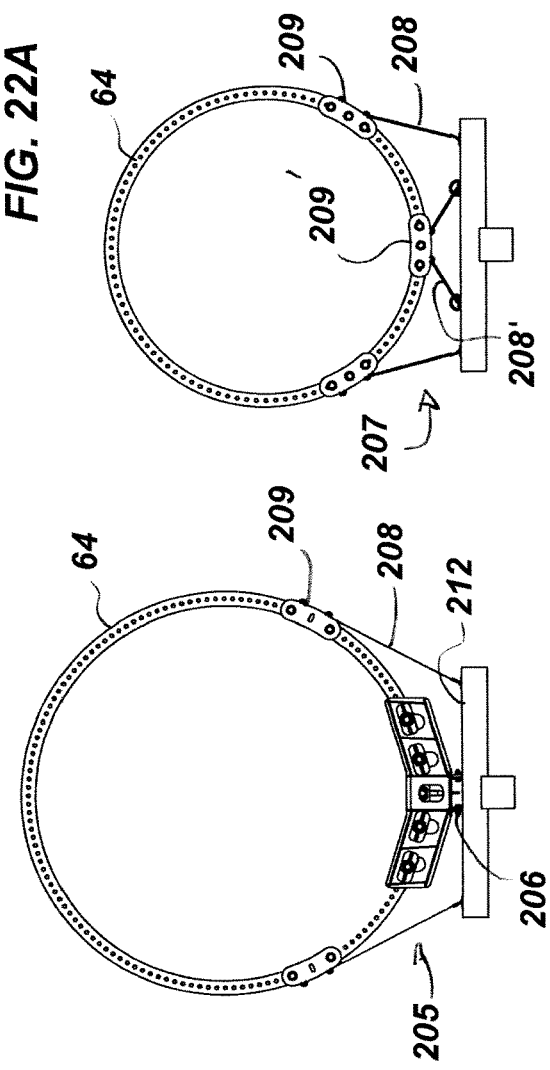
FIG. 22A
FIG. 22B
FIG. 22C
FIG. 22D

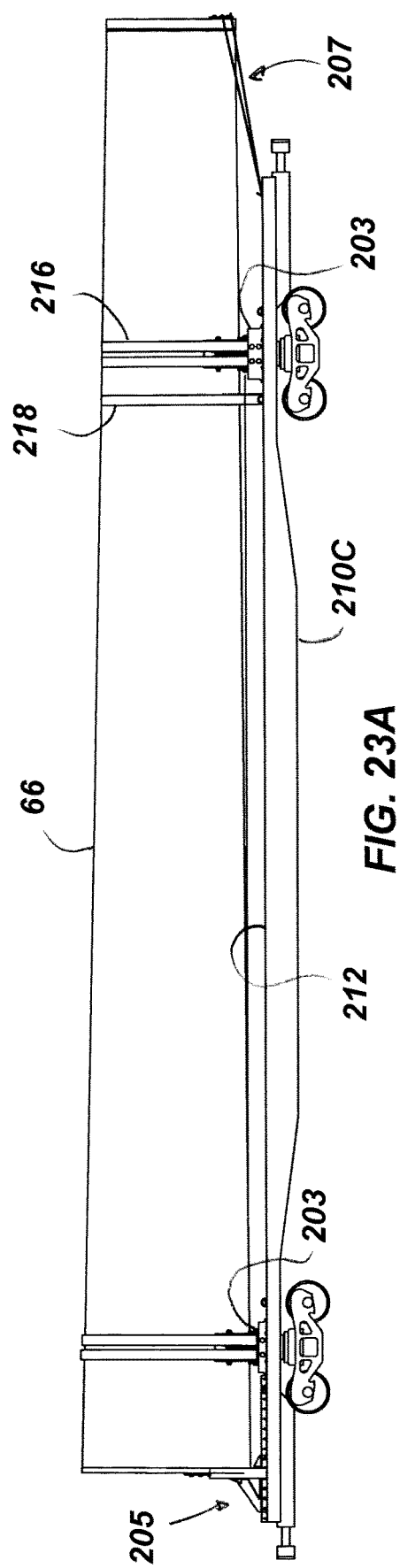
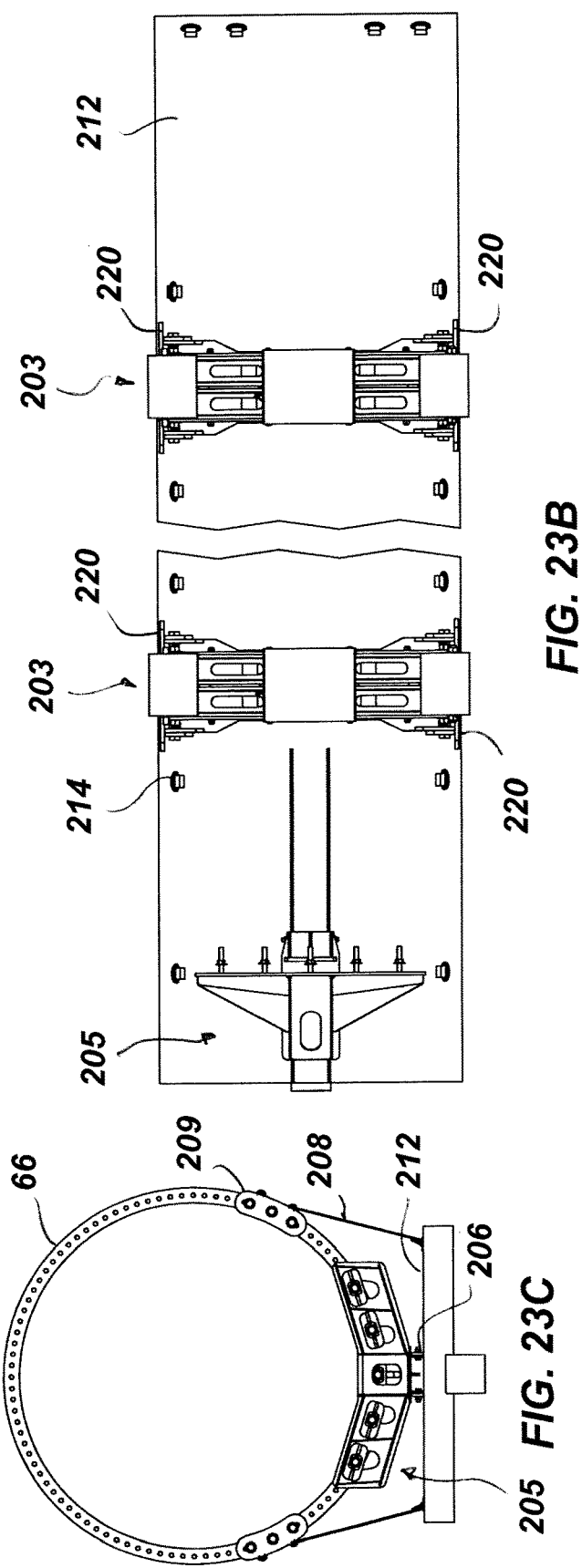
FIG. 23A
FIG. 23B
FIG. 23C

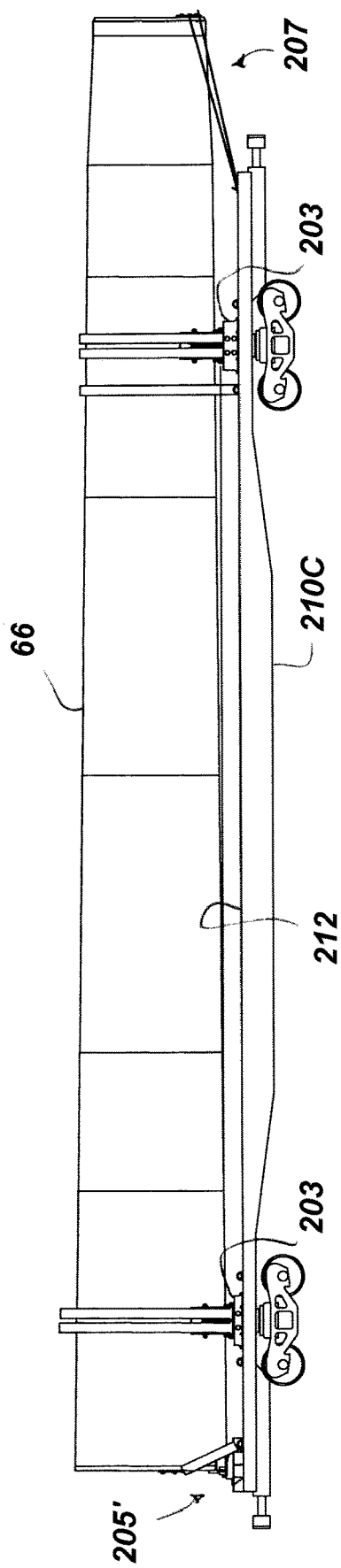
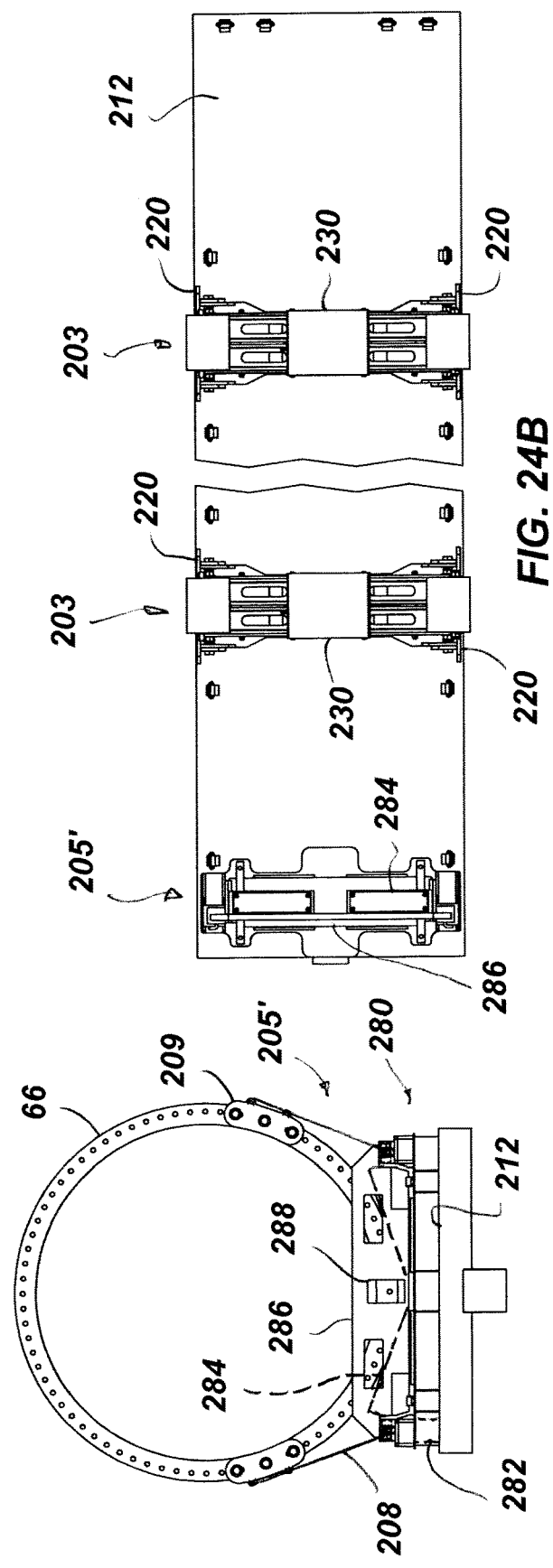
FIG. 24A
FIG. 24B
FIG. 24C

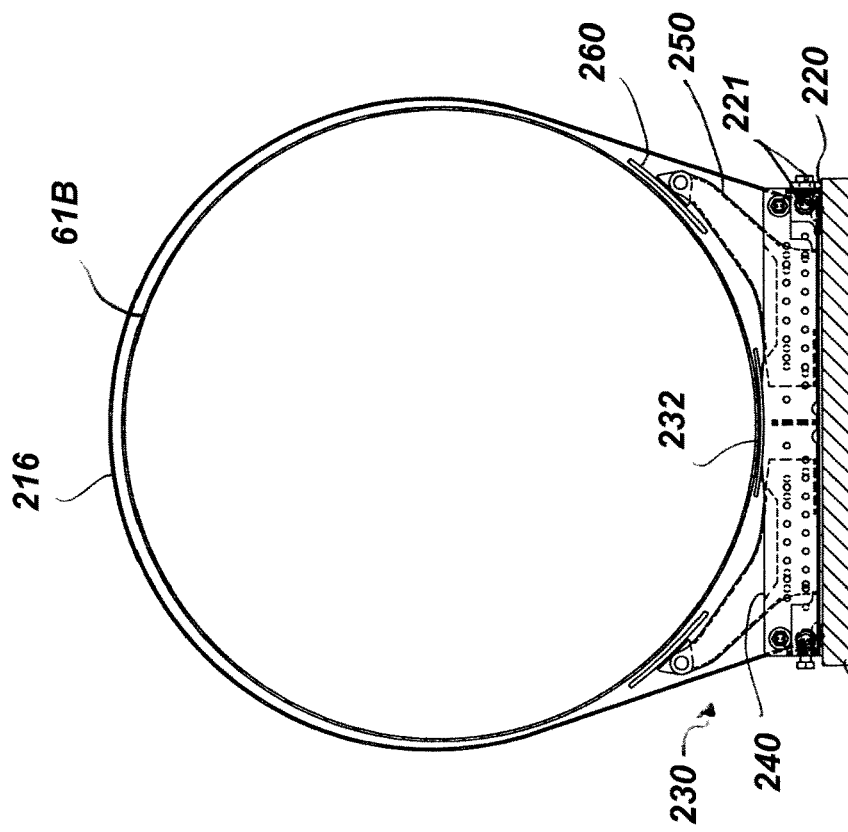
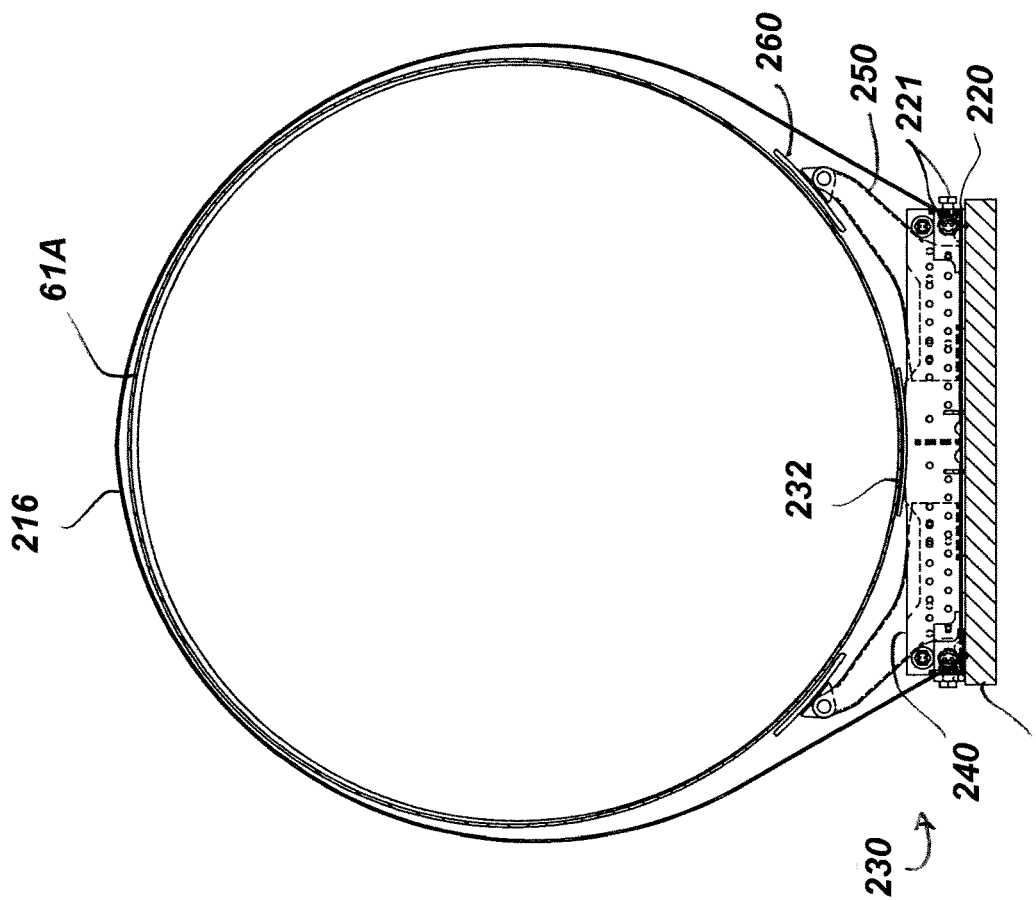

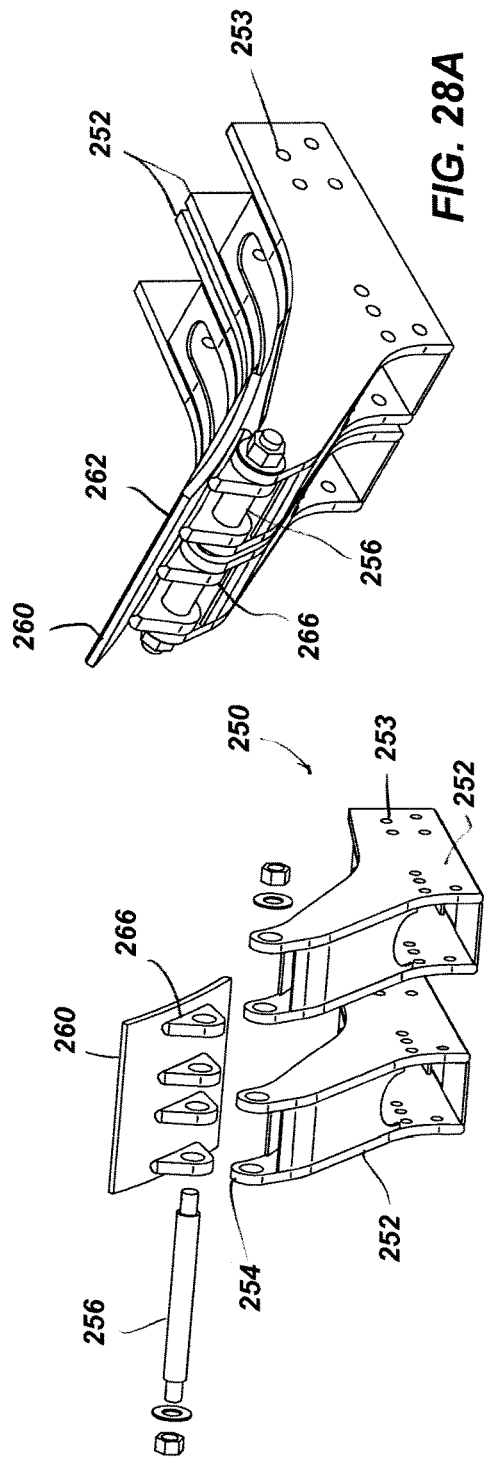
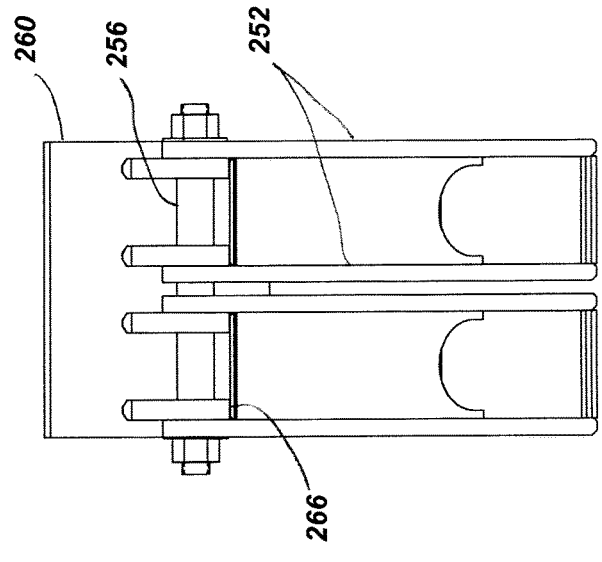
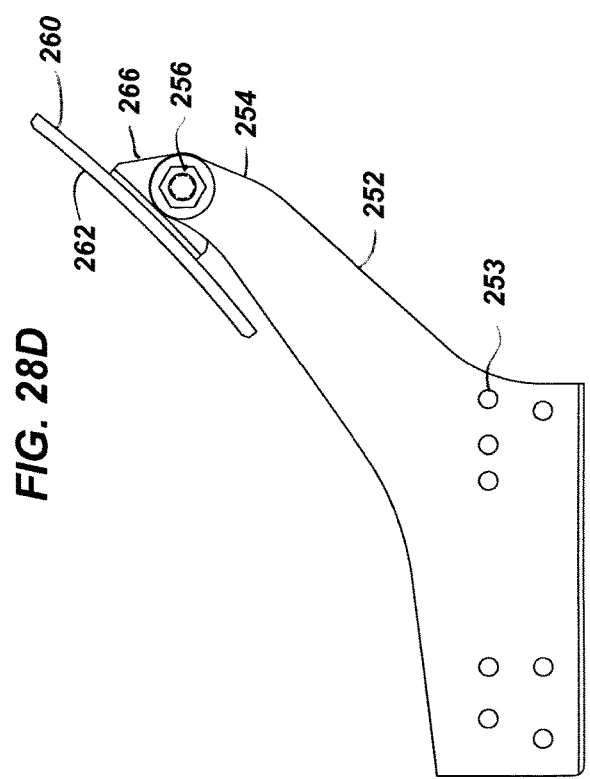
FIG. 28A
FIG. 28B
FIG. 28C
FIG. 28D

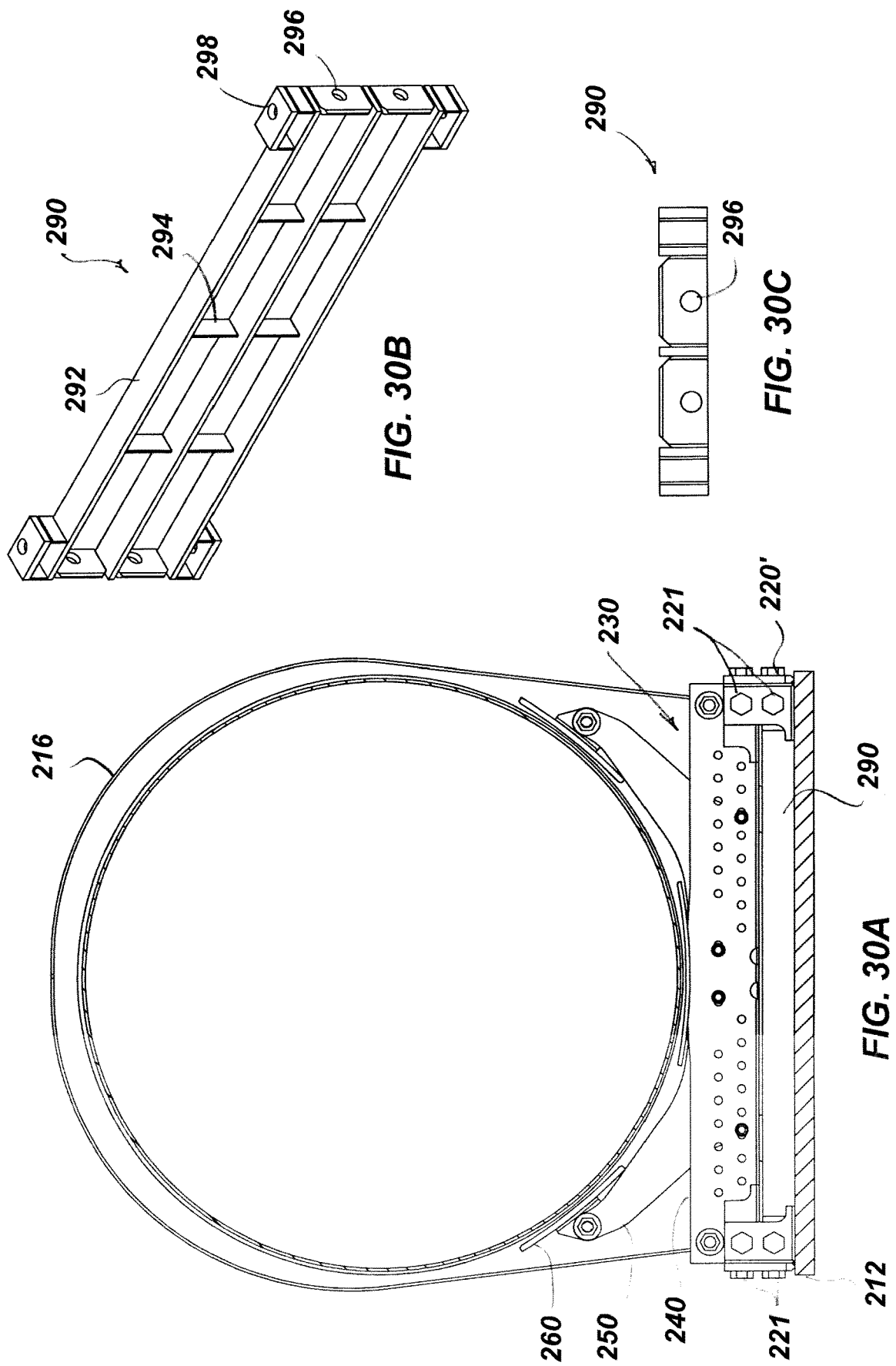

MODULAR SYSTEMS AND METHODS FOR TRANSPORTING TOWER ASSEMBLY OF WIND TURBINE

CROSS-REFERENCE TO RELATED APPLICATIONS

This is a continuation of U.S. application Ser. No. 15/603,172, filed May 23, 2017, which is a continuation-in-part of U.S. application Ser. No. 15/057,765, filed Mar. 1, 2016, which claims the benefit of U.S. Provisional Appl. 62/261,183, filed Nov. 30, 2015, both of which are incorporated by reference.

FIELD OF THE DISCLOSURE

The subject matter of the present disclosure relates to systems and methods for transporting cylindrical tower sections, such as used for commercial wind turbines, using one or more railcars or other transport devices.

BACKGROUND OF THE DISCLOSURE

A wind turbine, such as a Horizontal Axis Wind Turbine, for generating electrical power has a tower that support a nacelle at its top end. A rotor extends from the nacelle and has turbine blades. During operation, prevailing winds cause the turbine blades to rotate the rotor, which is coupled to a generator within the nacelle to produce electricity. To orient the blades, the nacelle can turn about the vertical axis of the tower.

The tower can be any acceptable height. However, the power generation capacity of a wind turbine is directly related to how long the turbine blades are. The length of the turbine blades in turn dictates the required height of the tower. In some large-scale installations, the blades can be about 45-meters long, and the tower can be as much as 90-meters high. Generally, the tower tapers from its base to its top end, which still provides the required strength but with reduced material and fabrication costs. Due to their overall height, the tower is manufactured and transported in a number of tower sections that assemble together at the installation site.

As will be appreciated, the different components of the wind turbine are separately manufactured, sometimes at different locations, and are then transported in pieces to the desired site where they are assembled. Because the components are manufactured in many different places, a number of various forms of transportation must be used, including ships, barges, trains, and trucks.

The sheer size of the various components complicates the transportation. Additionally, the components must be protected and handled properly during transportation to prevent damage. Moreover, the components in many cases must be switched from one mode of transport to another mode during stages of the journey. In the end, it will be appreciated that the logistics to move the various components from the point of manufacture to the ultimate installation site can be complicated, expensive, and time consuming.

Each mode of transport presents challenges to transporting the tower sections. In particular, the profile for railroad transport can be tightly limited because the trains must traverse curved sections and complex rail yards. Mounting fixtures are used to fix the tower sections to railcars during transport.

A particular example of mounting fixtures for fixing tower sections is disclosed in U.S. Pat. No. 8,529,174. Reproduced here in FIG. 1, a train 2 is shown for transporting a three-section tower assembly via rail 1 according to the prior art. The train 2 has three railroad flatcars 4, 6, and 8 traversing the rail 1, and the tower assembly has three tower sections, which include a base tower section 12, a middle tower section 14, and a top tower section 10—each tapering from the base to the top. The base tower section 12 is loaded onto a center flatcar 6 and is disposed toward one end of the flatcar 6, clearing an open area at the opposite end of the flatcar 6. The middle tower section 14 is loaded onto another flatcar 8 and has a length that takes up most of the length of the flatcar 8. The top tower section 10 is loaded onto yet another flatcar 4. The length of the top tower section 10 is longer than the length of the flatcar 4 so that one end of the section 10 extends over the next coupled flatcar 6.

Each of the tower sections 10, 12, 14 is supported on the flatcars 4, 6, and 8 using saddle assemblies. Looking in particular at how the middle tower section 14 is supported on the flatcar 8, reference is directed to FIG. 2A. The flatcar 8 is a conventional 90-foot flatcar with a pair of conventional bolsters 48, 50, and a load deck 11. In this example, the tower section 14 has a length approximately as long as the flatcar's deck 11. The middle tower section 14 includes an internal flange 30 on its larger circumference end for engaging the base tower section (12) when the tower is finally assembled. The flange 30 is also used as an attachment point for a stop 34 disposed between the flatcar's deck 11 and the tower section 14 during transit. The stop 34 retains the tower section 14 against longitudinal movement with respect to the flatcar 8. To a lesser extent, the stop 34 also retains the tower section 14 against lateral movement.

The primary lateral support is by saddles assemblies 38, 42. The weight of the tower section 14 is supported by a first saddle assembly 38 located over the bolster 48, and a second saddle assembly 42 located over the other bolster 50. The second saddle assembly 42 also includes a spacer assembly 44.

The sectional view of FIG. 2B is taken at the location of the flange 30 on the end of tower section 14. Plural connecting bolts join the flange 30 to the stop 34, which has previously been fixed to the deck 11, such as by welding or other suitable means. As illustrated, the stop 34 is comprised of an attachment plate bolted to the flange 30, and of plural gusset plates welded to the attachment plate and the deck 11 of the flatcar 8.

The sectional view of FIG. 2C is taken at the position of the bolster 48 of the flatcar 8 where the saddle assembly 38 is situated. The saddle assembly 38 is fixed to the deck 11 of the flatcar 14. The upper surface of the saddle assembly 38 is a saddle that conforms to the shape of the tower section 14 at a location along the elongated portion of the tower section 14 at which the saddles assembly 38 engages. Because the tower 14 is circular in cross-section, the saddle assembly 38 is an arcuate circular section, conforming to the exterior shape of the tower section 14. A resilient saddle liner 40 is disposed between saddle assembly 38 and the surface of the tower section 14 to protect the surface finish of the tower section 14 and to accommodate small variances between the two surface shapes.

The sectional view of FIG. 2D is taken at the location of the other bolster 50, which is also the location of the other saddle assembly 42. This saddle assembly 42 is substantially the same as the other saddle assembly 38. To accommodate different sizes and shapes of the tower cross sections, a spacer assembly 44 is positioned on top of saddle assembly 42 and adapts the conformal shape of the saddle assembly 42 to the exterior shape of the tower section 14 at the location of support of saddle assembly 42. Because the tower section 14 has a smaller diameter at the location of saddle assembly 42, the spacer assembly 44 presents a correspondingly smaller diameter spacer saddle profile. A resilient liner 46 is disposed between the spacer assembly saddle 44 and the tower 14. Also, the saddle assembly 42 is fixed to the deck 11 of the flatcar 8 using pins disposed between fixed deck brackets and gussets on the saddle assembly.

Although current techniques are available for transporting tower sections on a railcar, such as disclosed in U.S. Pat. No. 8,529,174, transportation personnel are continually seeking more versatile and useful ways to transport large cylindrical objects, such as tower sections of a wind turbine.

SUMMARY OF THE DISCLOSURE

According to the present disclosure, a modular system is used for transporting a plurality of cylindrical items, such as sections of a tower assembly for a wind turbine. The system includes a plurality of transport devices and a plurality of support members. The transport devices each have a bed with a plurality of support locations thereon. Each of the transport devices accommodates one of the tower sections thereon.

The support members are each positionable at one of the support locations to support the cylindrical items (e.g., tower sections) on the beds of the transport devices. Each of the support members have a cradle surface against which the tower section is rests. The cradle surfaces are adjustable on the support member between a plurality of circumferential dimensions. At least one of the support members on each of the transport devices is a foot having a flange affixable to an end of the tower section supported on the bed of the transport device.

The transport device can be a railroad car, such as a flatcar with a bed. The bed can have at least two support locations, such as towards the ends of the bed. Preferably, more than two support locations are provided, especially in intermediate locations on the bed, so the flatcar can accommodate any of the various tower sections.

Each support location can be the same as the others so that the system maintains its modularity. In one arrangement, the support locations include a number of inner tabs or clips in the bed of the flatcar. The support locations can also include outer tabs or clips affixed to the bed of the flatcar. The outer tabs are used for affixing the feet in place. The inner tabs are used for holding the support members laterally and longitudinally on the bed of the flatcar. The weight of the cylindrical tower sections may be all that is need to hold the support members against the surface of the flatcar's bed.

The modular system is a fixture and securement system that can be readily adjustable to fit a range of configurations. No welding is required for the adjustment from one tower section to another. The system reduces overall costs by reducing the number of railcars need for transport and eliminating dwell time of the railcars when being prepared, loaded, and unloaded.

The adjustable fixtures accommodate multiple tower sizes, weights, and centers of gravity. One-time set up is needed for preparing the flatcars, and there is no need for welding once the flatcar is set up. Accordingly, installation field personnel can adjust the modular components of the system as needed. For example, a method of the present disclosure can involve: adjusting a circumferential dimension of a cradle on each support against which a tower section rests; adjusting a height of a base supporting a hinge, the cradle surface, and a saddle above a bed of the transport device; changing a position of a saddle on the base; engaging a plurality of tabs and slots on the base and the saddle with one another to hold the saddle in position on the base; positioning one or more spacers between an edge of the base and the saddle to hold the saddle in position on the base; and selecting from a plurality of the spacers of different lengths for adjusting the position of the saddle on the base.

As disclosed herein, a system can transport a tower section of a wind turbine. The tower section has a length and a circumference. The system comprises a transport device, end supports, and at least one intermediate support. The transport device has a bed, and the end supports are each disposed on the bed and affix to one end of the tower section. At least one of the end supports is longitudinally adjustable relative to the bed to accommodate the length of the tower section. The at least one intermediate support is disposed on the bed and supports portion of the tower section. The at least one intermediate support has a cradle being adjustable circumferentially against which the tower section rests to accommodate the circumference of the tower section.

The transport device can be selected from the group consisting of a railroad car, a flatcar, a vessel, a ship, a tug, a barge, a truck, a trailer, a pallet, and a shipping container.

The system can includ4e a plurality of support locations disposed on the bed of the transport device at which the end supports and the at least one intermediate support are disposed. For example, the support location for the at least one intermediate support can include one or more tabs disposed on the bed of the transport device to restraining the at least one intermediate support positionable thereon at least laterally and longitudinally on the bed. The at least one intermediate support can be affixable by fasteners to the one or more tabs disposed on the bed.

In another example, one of the support locations for the at least one adjustable end support can include a rail disposed longitudinally on the bed. The at least one adjustable end support can be adjustably affixable to the rail and can have a flange affixable to the end of the tower section. At least one anchor can be affixed to the end of the tower section and connected by at least one line to the bed.

In yet another example, the at least one adjustable end support can include at least one anchor affixed to the end of the tower section and connected by at least one line to the bed.

One of the end supports can be a fixed flange affixable between the bed and the end of the tower section. This fixed flange can include a cradle being adjustable circumferentially against which the tower section rests. Further, at least one anchor can be affixed to the end of the tower section and can connected by at least one line to the bed.

The at least one intermediate support can include a lashing connected to the at least one intermediate support and lashed about the portion of the tower section.

The at least one intermediate support can include a hinge and a saddle. The hinge is positioned adjacent the bed of the transport device and supports a cradle surface of the adjustable cradle. The saddle is positioned between the bed and the cradle surface and is adjustable relative to the hinge to adjust an angle of the cradle surface relative to the bed. In one example, the hinge affixes the cradle surface to the saddle.

The at least one intermediate support can include a base positioned against the bed of the transport device. The base can have the saddle positioned thereon. A lift supporting the hinge, the cradle surface, and the saddle can elevate the support a height above the bed.

The base and the saddle comprises a plurality of tabs and slots engageable with one another to hold the saddle in position on the base. Each of the base and the saddle can use the slots adjustably alignable with one another so the saddle can be laterally adjustable relative to the base. The tabs, which can be bolts, can affix between the aligned slots of the base and saddle to retain the saddle laterally relative to the base.

According to the present disclosure, a system for transporting a tower section of a wind turbine comprises a transport device, a plurality of bed supports, first and second end supports, and intermediate supports. The transport device has a bed, and the plurality of bed supports are disposed on the bed of the transport device. The first end support is disposed at a first of the bed supports and affixes to one end of the tower section. The second end support is disposed at a second of the bed supports and affixes to another end of the tower section. The second end support is adjustable longitudinally at the second bed support to accommodate the length of the tower section. The intermediate supports are disposed at one of the bed supports and support portion of the tower section. The intermediate supports each having a cradle being adjustable circumferentially against which the tower section rests to accommodate the circumference of the tower section.

According to the present disclosure, a system can adapt a transport device to transport a tower section of a wind turbine on a bed of the transport device. The system comprises a first bed support positioning on the bed of the transport device and comprises a first end support positioning at the first of the bed supports to affix to one end of the tower section. The system comprises a second bed support positioning on the bed of the transport device and comprises a second end support positioning at a second of the bed supports to affix to another end of the tower section. The second end support is adjustable longitudinally at the second bed support. The system comprises at least one intermediate bed support positioning on the bed of the transport device and comprises at least one intermediate support positioning at the at least one intermediate bed support and supporting portion of the tower section. The at least one intermediate support has a cradle being adjustable circumferentially against which the tower section rests.

According to the present disclosure, a method of transporting a tower section of a wind turbine comprises positioning ends supports at end locations on a bed of a transport device; positioning at least one intermediate support at at least one intermediate location on the bed of the transport device; adjusting at least one of the end supports to accommodate the length of the tower section; adjusting a moveable cradle on the at least one intermediate support against which the tower section rests to accommodate the circumference; loading the tower section on the transport device; and affixing the tower section to the end supports.

The foregoing summary is not intended to summarize each potential embodiment or every aspect of the present disclosure.

BRIEF DESCRIPTION OF THE DRAWINGS

FIGS. 4A-4C illustrate plan, side, and detailed views of a flatcar of the modular assembly.

FIG. 4D illustrates an isolated view of an inner clip for the flatcar of the modular assembly.

FIG. 4E illustrates an isolated view of an outer clip for the flatcar of the modular assembly.

FIGS. 8A-8E illustrate various views of a saddle for the disclosed cradle.

FIGS. 9A-9E illustrate various views of a foot of the disclosed modular assembly.

FIGS. 11A-1B illustrate perspective views of a base for the disclosed foot.

FIG. 13 illustrates views of one type of spacer for the saddle on the base of a cradle or foot.

FIGS. 14A-14B illustrate side and end views of a portion of a cradle with first spacers for the saddle.

FIG. 15 illustrates a side view of a portion of a cradle with second spacers for the saddle.

FIGS. 16A-16B illustrate a container holding various spacers for the modular assembly.

FIGS. 18A-18D illustrate perspective, plan, side, and end views of an elevated cradle of the disclosed modular assembly.

FIGS. 21A-21B illustrate a side view and a plan view of one of the flatcars of the modular assembly.

FIG. 21C illustrates an isolated plan view of a bed support for the flatcar.

FIGS. 22A-22D illustrate a side view, a plan view, and opposing end views of another of the flatcars of the modular assembly.

FIGS. 23A-23C illustrate a side view, a plan view, and an end view of yet another of the flatcars of the modular assembly.

FIGS. 24A-24C illustrate a side view, a plan view, and an end view of an alternative of the flatcars of the modular assembly.

FIGS. 26A-26B illustrate end views of the cradle of the disclosed modular assembly in two adjusted states.

FIGS. 28A-28D illustrate a perspective view, a side view, an end view, and an expanded view of a saddle of the disclosed cradle.

FIGS. 30A-30C illustrate an elevation arrangement for the disclosed cradle.

DETAILED DESCRIPTION OF THE DISCLOSURE

Figure 1:
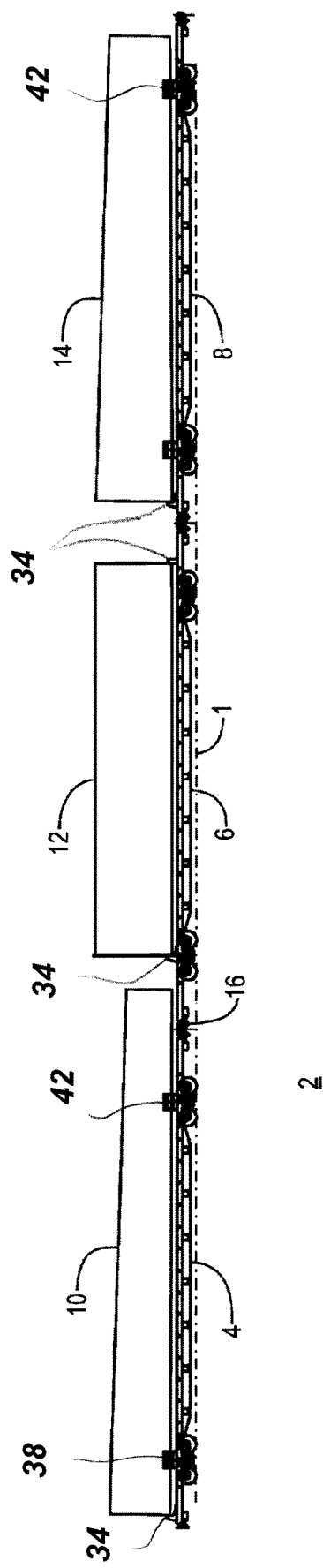
FIG. 1 illustrates an example of a train carrying three tower sections according to the prior art.
Figure 2A:
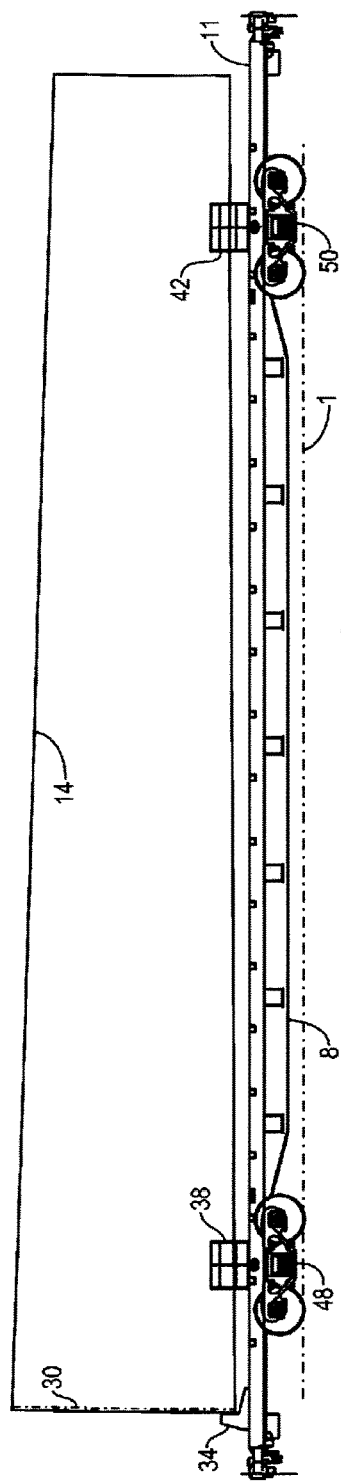
FIG. 2A illustrates a side view of one of the tower sections in FIG. 1 loaded on a railcar according to the prior art.
Figure 2B:
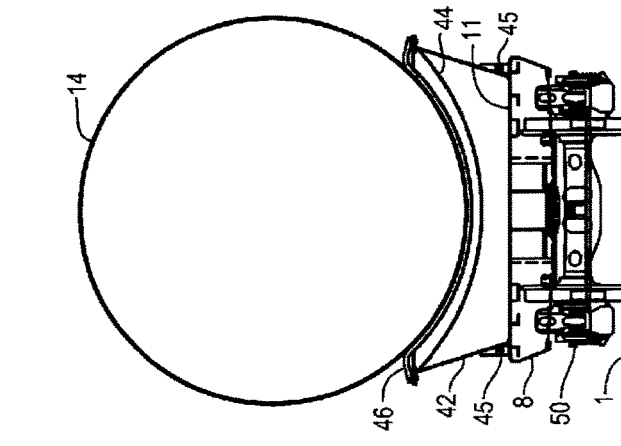
FIGS. 2B-2D illustrate sectional views of the tower section loaded on the railcar in FIG. 2A.
Figure 2C:
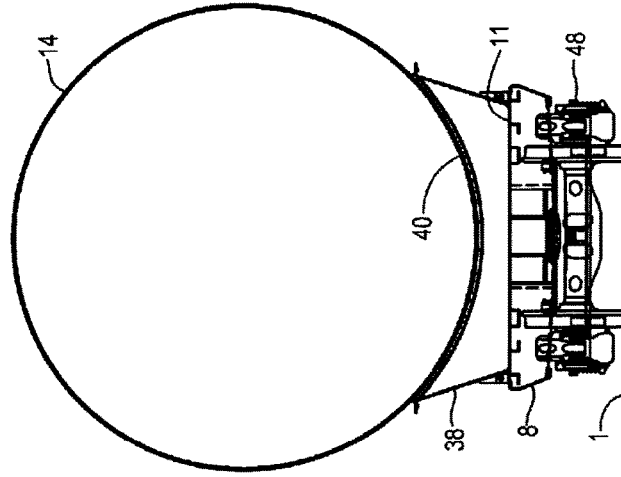
Figure 2D:
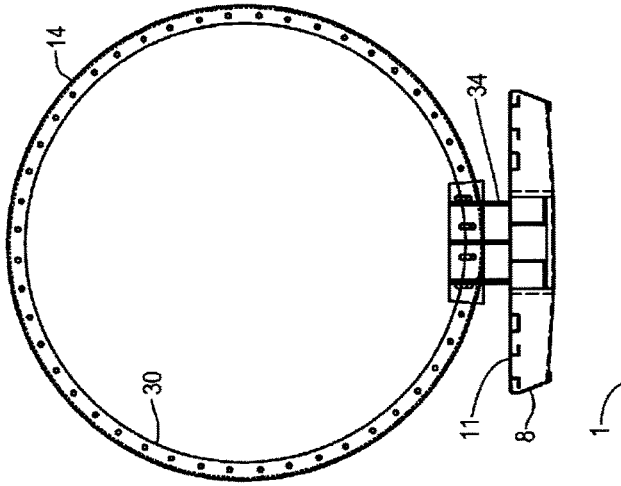
Figure 3:
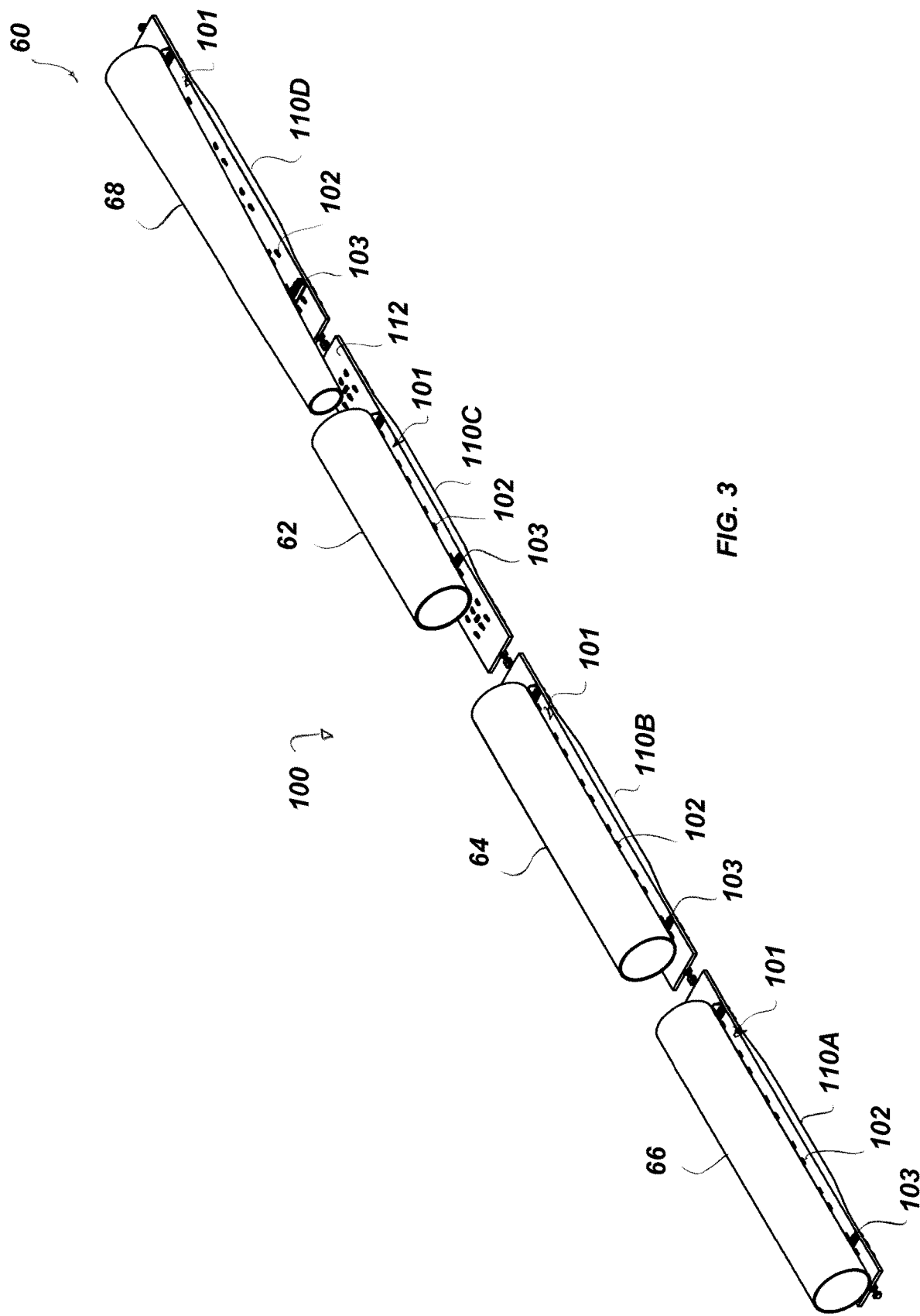
FIG. 3 illustrates an example of a modular assembly according to the present disclosure transporting sections of a tower assembly.

Referring to FIG. 3, transport devices 110A-D transport four cylindrical items, namely tower sections 62, 64, 66, and 68 of a tower assembly 60 for a wind turbine. The tower sections 62, 64, 66, and 68 represent a type of heavy-lift and over-dimension cargo, which requires significant coordination and time to transport. Other tower assembles with other numbers of tower sections and lengths can readily be accommodated by the teachings of the present disclosure.

As shown herein FIG. 3, the tower sections 62 . . . 68 can be transported by rail. Transporting the tower assembly 60 requires the right selection of railcars, be they heavy-duty, multi-axle, or Schnabel types of railcars. The tower sections 62 . . . 68 can also be transported by road transport using regular, specialized multi-axle, articulated, air ride, or hydraulic heavy haul types of equipment and trucks. Moreover, the tower sections (62 . . . 68) can be transported by vessels, ships, tugs, barges, trucks, trailers, pallets, shipping containers, and the like. The teachings of the present disclosure can therefore apply not only to railcars as shown, but to other transport devices.

Again, the transport devices 110A-D as shown here can be railcars for transporting the tower assembly 60 by rail. The railcars include a first flatcar 110A supporting an upper intermediate tower section 66, a second flatcar 110B supporting a lower intermediate tower sections 64, a third flatcar 110C supporting a base tower section 62, and a fourth flatcar 110D supporting a top tower section 68. As is typical, each of these tower sections 68 taper from its base end to its top end.

The base tower section 62 loaded onto third flatcar 110C does not take up the full length so that clearance is available for an overhang of the top tower section 68 on the following flatcar 110D. The other tower sections 64 and 66 may generally fit the length of their flatcars 110A-B. As will be appreciated, a tower assembly 60 may have more or less sections, and they can be arranged in a different order as the case may be.

A modular assembly 100 supports the tower sections 62, 64, 66, and 68 on the flatcars 110A-D. Each of the flatcars 110A-D can accommodate at least one of the tower sections 62, 64, 66, and 68 thereon using a plurality of supports 101 of the module assembly 100. The supports 101 include a plurality of bed supports 102 affixable at support locations on the beds 112 of the flatcars 110A-D. The supports 101 also include a plurality of intermediate or cradle supports 103 engageable to the bed supports 102. Finally, the supports 101 include a plurality of end supports or feet 130' engageable to the bed supports 102. In this way, each of the supports 101 is positionable at one of the support locations in a modular fashion to support the tower sections 62, 64, 66, and 68 on the beds 112 of the flatcars 110A-D.

Each of the intermediate or cradle supports 103 have an adjustable cradle against which the tower section 62, 64, 66, and 68 rests. The adjustable cradle can be adjusted on each cradle support 103 between a plurality of circumferential dimensions, which can be set to the particular circumference of the tower section 62, 64, 66, and 68 being supported. At least one of the supports 101 (i.e., end support or foot 130') on each of the flatcars 110A-D is affixable to an end of the tower section supported on the bed 112 of the flatcar 110A-D.

As shown in FIGS. 4A-4B, the bed supports 102 at the support locations include one or more tabs 122, 125 disposed on the bed 112 of the flatcars 110A-D for restraining the cradle supports (103) positionable thereon. The tabs 122, 125 at least laterally and longitudinally restrain the cradle supports 103 on the bed.

The one or more tabs 122, 125 can include one or more inner tabs 122 extending from the bed 112 of the flatcar 110 and positionable in one or more slots of the cradle support (103) positionable on the bed 112 at the support location 120.

The one or more tabs 122, 125 can include one or more outer tabs 125 extending from the bed 112 of the flatcar 110 and positionable adjacent one or more edges of the cradle support (103) positionable on the bed 112 at the support location 120. Depending on the arrangement, at least one of the one or more outer tabs 125 can affix to the at least one of the cradle support (103) that affixes to the end of the tower section (62 . . . 68).

Figure 5:
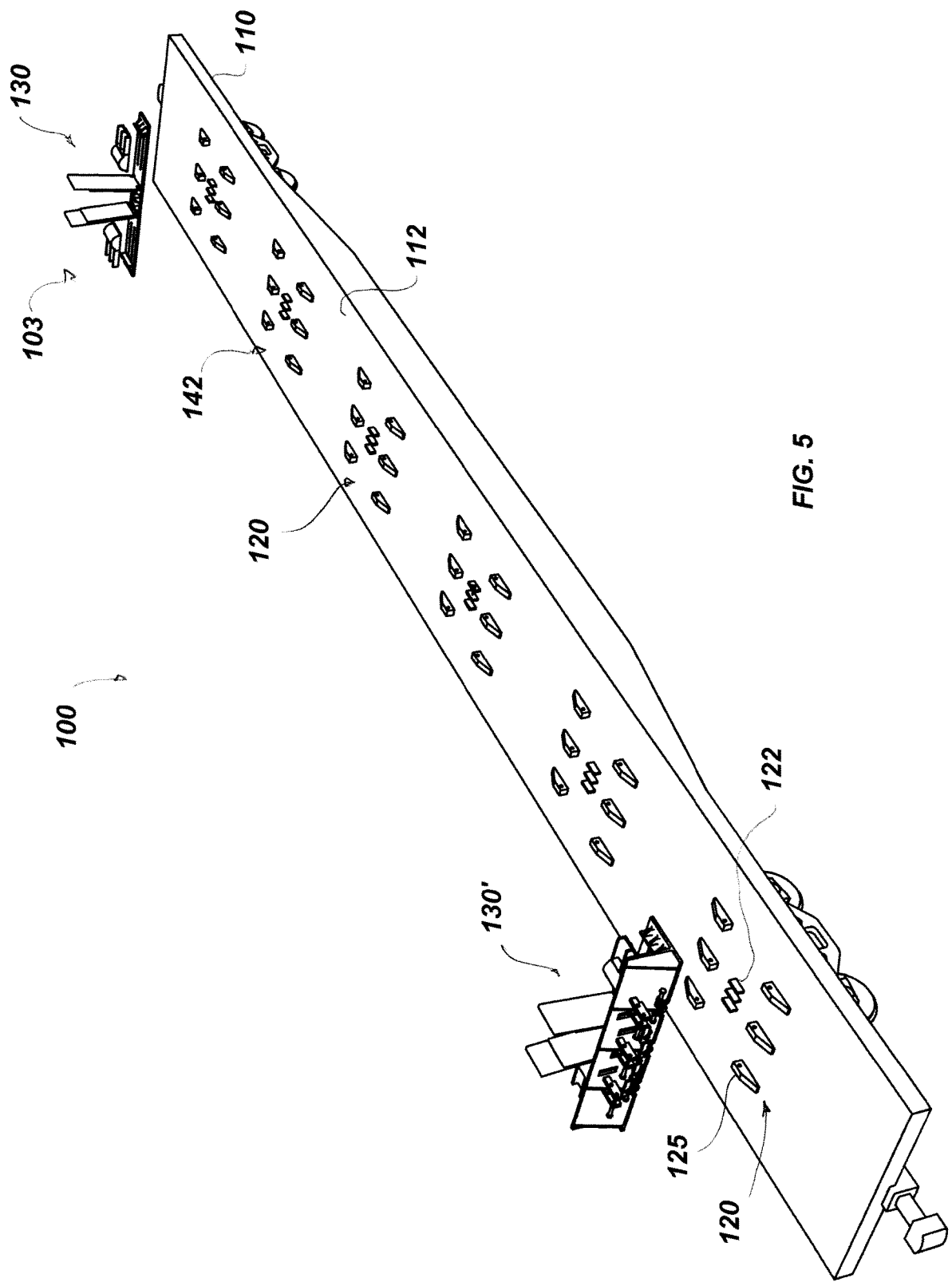
FIG. 5 illustrates a flatcar being fitted with a cradle and a foot of the disclosed modular assembly.

As shown in FIG. 5, for example, each of the tower sections (62 . . . 68) is supported on the flatcars 110A-D using adjustable cradles 130 and feet 130' as the supports (101), which are discussed in more detail below. Additionally, the adjustable cradles 130 and the feet 130' can fit on configured locations 120 on the flatcars 110A-D. In this way, various flatcars 110, cradles 130, and feet 130' can be configured to accommodate various tower sections having different arrangements, tapers, lengths, etc. Lashing using straps or tie downs (not shown) can be further added to the flatcars 110A-D to support the tower sections 62, 64, 66, and 68, but separate lashing may not be necessary. Overall, the modular system 100 preferably meets longitudinal, lateral, and vertical railroad transport requirements.

Looking at the configuration of a flatcar 110 in more detail, FIGS. 4A-4C illustrate plan, side, and detailed views of a flatcar 110 of the modular assembly. The flatcar 110 has a bed 112 supported with trucks 114 and having couplings 116. The bed 112 has a number of support locations 120/120', which are the bed supports 102 where a tower section (not shown) can be supported on the bed 112. At least two support locations 120/120' are provided on the bed 112; however, preferably a number of support locations 120/120' are provided so various lengths of tower sections can be supported in different ways on the same flatcar 110. In the particular embodiment shown here, the flatcar's bed 112 has six support locations 120/120'. Although not strictly necessary in all implementations, it may be preferred to locate one or more of the support locations 120/120' over the rail trucks 114 so the weight of a supported load (i.e., tower section) may be more directly transferred to the underlying rails.

Each of the support locations 120/120' can be the same, or as specifically shown, different support locations 120/120' can be provided. A universal support location 120 has one or more inner tabs or clips 122 disposed between one or more opposing outer tabs or clips 125 on both sides. An end support location 120 has one or more inner tabs or clips 122 with one or more outer tabs or clips 125 only toward the end of the bed 112. In this particular example, two universal support locations 120 are centrally located on the bed 112. Two opposing sets of end support locations 120' are positioned toward the ends of the bed 112. Other configurations can be used.

The flatcar 110 can be prepared ahead of time and can be reused as necessary. In one embodiment, the flatcar 110 can be a four axle, 89-ft. flat deck railcar. As configured, the flatcar 110 has all the prepositioned support locations 120/120' to allow the cradle(s) (130) and the feet (130')' to be moved based on varying lengths of tower sections. In this way, a given tower section sits in the cradle(s) (130) and feet (130'), which can be adjusted for varying diameter sections, and the cradle(s) (130) and feet (130') can be moved to any of the pre-set support locations 120/120' to accommodate various diameters and lengths of tower sections.

In this particular example, a set of three inner clips 122 is used for each support location 120/120'. These inner clips 122 can be welded to the bed 112, can be disposed in configured slots in the bed 112, or can be otherwise affixed in place on the bed 112. For example, the inner clips 122 can be permanently welded to the bed 112 with ⅝" welds using type E70 rods. The outer clips 125 also come in sets of three disposed with wider spacing than the three inner clips 122. The outer clips 125 can be welded to the bed 112, can be disposed in configured slots in the bed 112, or can be otherwise affixed in place on the bed 112.

FIG. 4D illustrates an isolated view of an inner clip 122. As shown, the inner clip 122 can be a rectangular plate of steel. FIG. 4E illustrates an isolated view of an outer clip 125. As shown, the outer clip 125 can have a straight edge and a ramped edge. A lateral hole is also defined through the side of the outer clip 125. The ramp on the clip 125 may be provided for guiding and placing cradle supports (103), and the lateral hole can be provided for affixing to a cradle supports (103).

As noted above, cradle supports 103 including an adjustable cradle 130 and a foot 130' of the modular assembly 100 support a tower section on a flatcar 110. FIG. 5 illustrates a flatcar 110 being fitted with a cradle 130 and a foot 130' of the disclosed modular assembly 100. The cradle 130 and foot 130' can be positioned at any of the available support locations 120/120', which in this particular example are all the same so the cradle 130 and foot 130' can be placed for the particular size of the tower section to be supported on the bed 112. The foot 130' can be placed either at the lead or tail end of the flatcar 110, but preferably at the tail end to support the following end of the supported tower section. More than one cradle 130 can be used. Also, for some tower sections, two opposing feet 130' can be used at the ends of the tower section. These and other configurations can be used.

The cradle 130 supports the weight of the tower section and is adjustable to the outer dimension on the particular portion resting on the cradle 130 to support the section laterally. The foot 130' also supports the weight of the tower section and is adjustable to the outer dimension on the particular portion resting on the foot 130' to support the section laterally. As already mentioned, the foot 130' also affixes to the end of the tower section to support it longitudinally.

Looking now at the adjustable cradle 130, FIGS. 6A-6D illustrate perspective, plan, side, and end views of a cradle 130 of the disclosed modular assembly. In general, the cradle 130 has a hinge 148 that positions adjacent the bed (112) of the flatcar and supports an end of a cradle surface 160 of the adjustable cradle 130. Additionally, a saddle 150 is positioned between the bed (112) and the cradle surface 160 and is adjustable relative to the hinge 148 to adjust an angle of the cradle surface 160 relative to the bed (112). The hinge and saddle arrangement are mirrored on an opposing side of the cradle 130 so that an opposing angle of another cradle surface 160 can be adjusted relative to the bed (112) in a comparable manner.

As shown here, the hinge 148 is disposed on a base 140 of the cradle 130, and the saddle 150 fits on this base 140. This facilitates the assembly and the modularity of the cradle 130. It is possible for the hinge 148 to be a part of the bed supports (102) mounted directly on the bed (112) of the flatcar, and/or the saddle 150 can likewise rest directly against the bed (112). In this way, the cradle 130 may not require a base 140 because various elements may be made part of the bed supports (102) and vice versa.

Figure 6A:
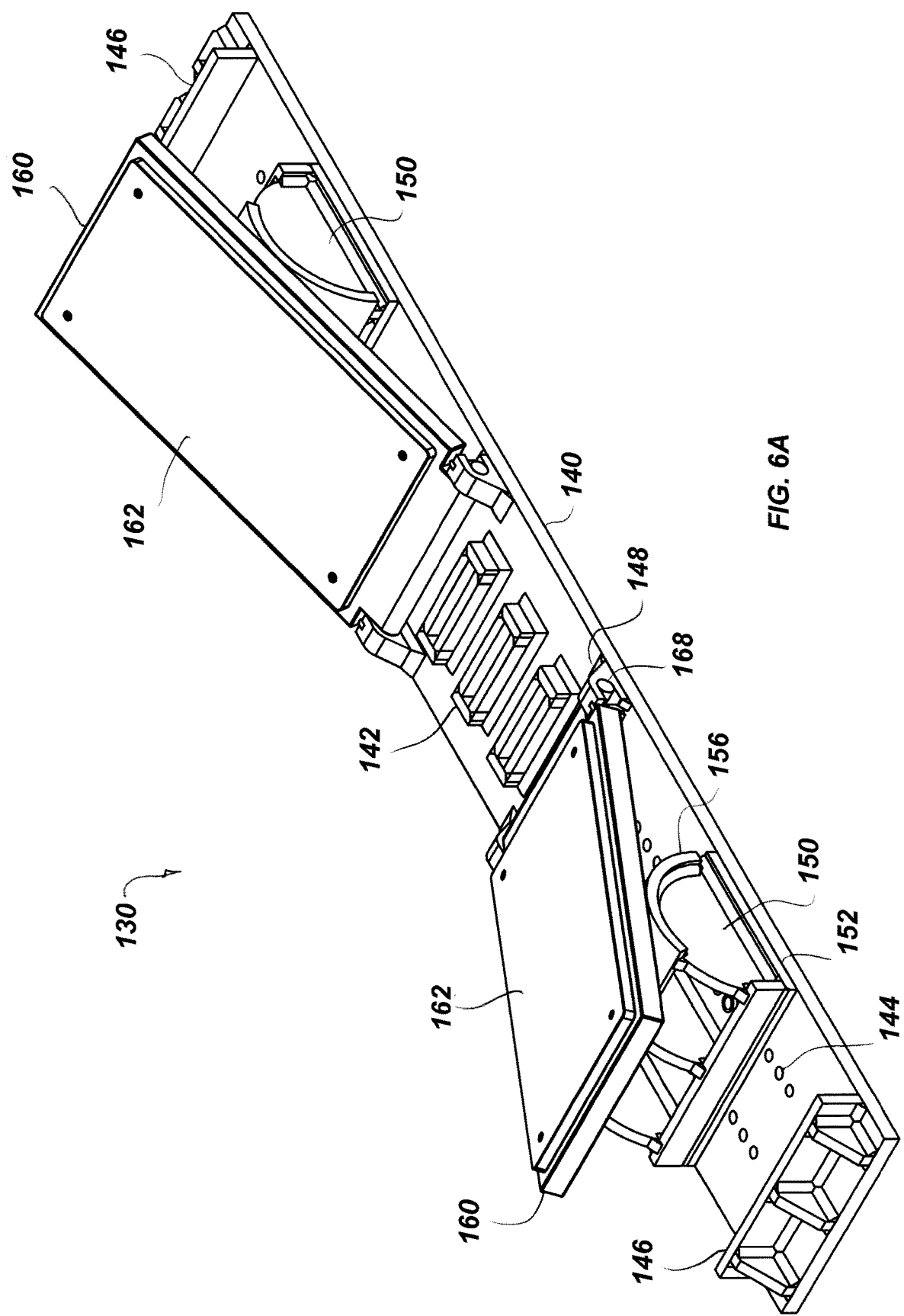
FIGS. 6A-6D illustrate perspective, plan, side, and end views of a cradle of the disclosed modular assembly.
Figure 6D:
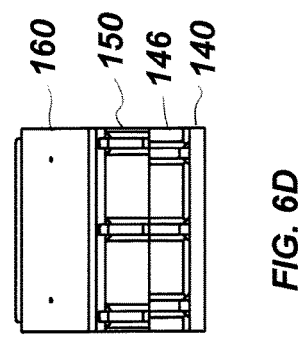
Figure 6B:
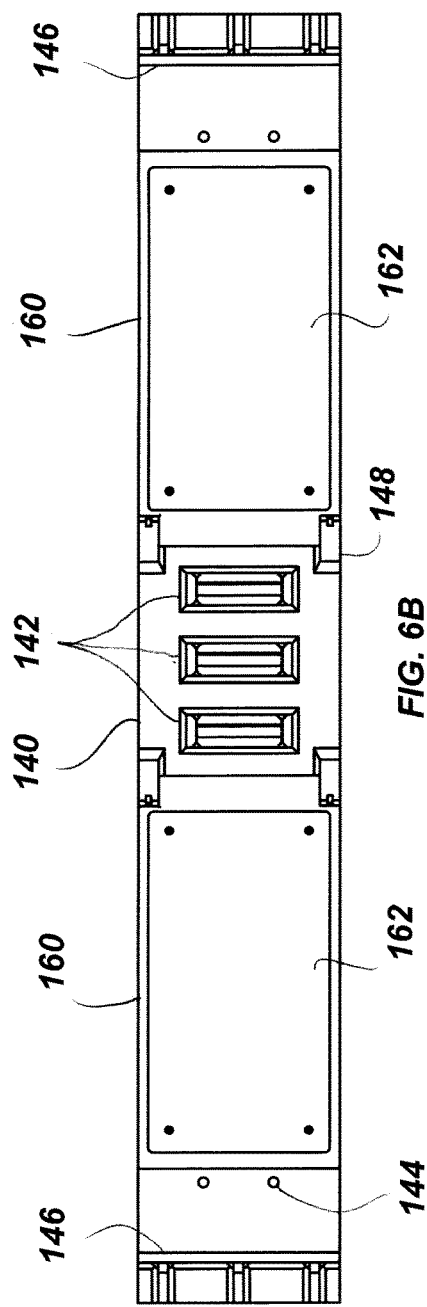
Figure 6C:
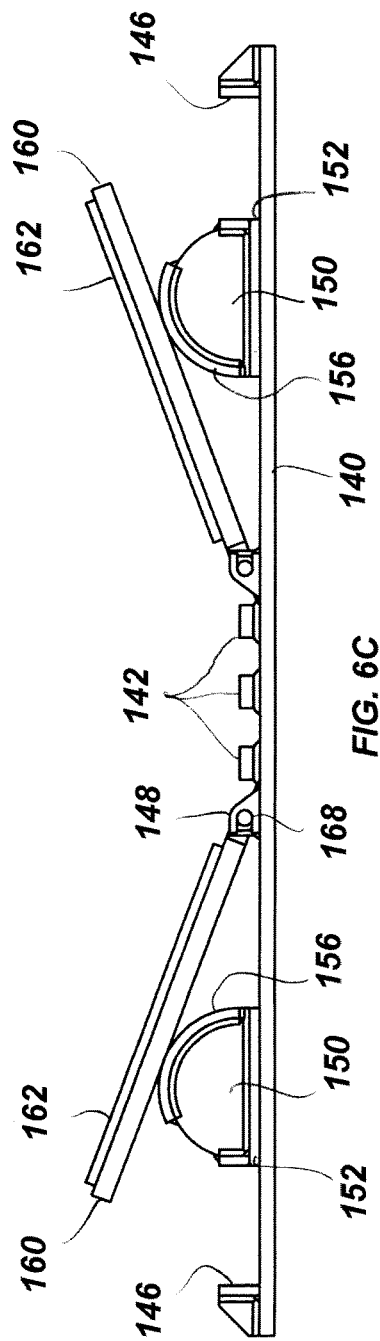
Figure 7:
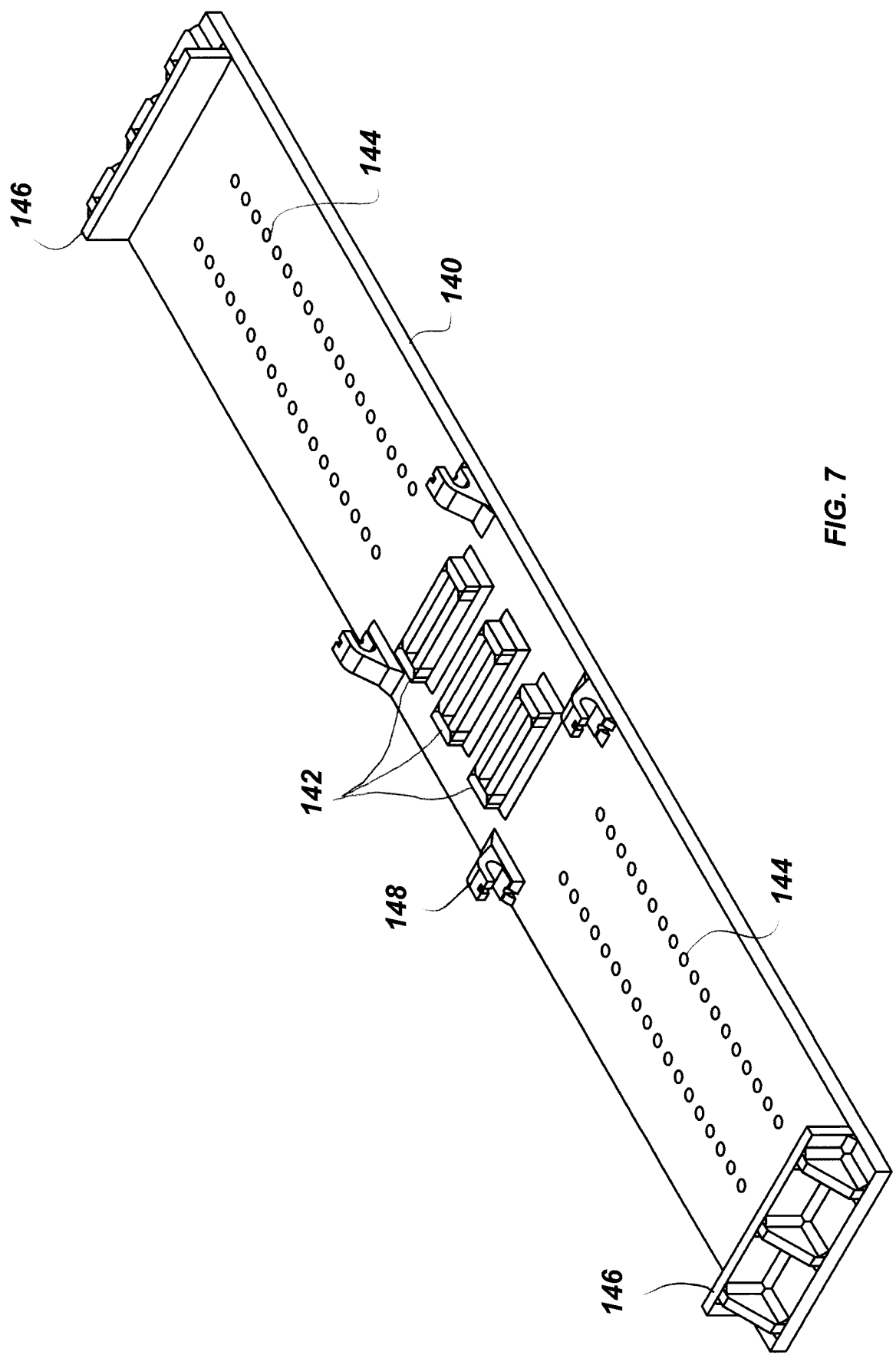
FIG. 7 illustrates an isolated view of the base for the disclosed cradle.

As shown in particular in FIGS. 6A-6B, the cradle 130 has the base 140 that rests against the bed (112) of the flatcar (110). (FIG. 7 illustrates an isolated view of the base 140 for the disclosed cradle 130.) Reinforced slots 142 in the central area of the base 140 fit over the inner clips (122) of a support location (120/120') where the cradle 130 is positioned. As noted above, the cradle 130 is restrained at least in part using the internal clips (122). Due to rail requirements, the cradle 130 may or may not need to be bolted, pinned, or the like to the bed (112), such as to the inner clips (122) or to the outer clips (125) as the foot (130) is.

Saddles 150 are positioned on opposing ends of the base 140 and hold up the cradle surfaces 160 pivoted on pivot pins 168 installed in the base hinges 148. (FIGS. 8A-8E illustrate various views of a saddle 150 for the disclosed cradle 130.) The saddle 150 has a bottom surface 152 that sets against the base 140 and has a bearing surface 156 against which the cradle surface 160 rests. The cradle surface 160 can have a pad 162 of protective material, such as rubber, neoprene, or the like, against which the surface of the tower section rests.

In one arrangement, the base 140 and the saddle 150 have a plurality of tabs and slots engageable with one another to hold the saddle 150 in position on the base 140. For example, the saddle 150 can have tabs, the base 140 can have slots, both can have the reverse, or both can each have tabs and slots. As shown in this particular example, the bottom surface 152 of the saddle 150 can have extending features or tabs 154 for adjustably setting in apertures or slots 144 in the surface of the base 140 so that particular placement of the saddle 150 can be set on the cradle 130. The extending features 154 can be integral tabs formed on the bottom surface 152, or the bottom surface 152 can have a number of holes for receiving inserted pins for the extending features 154. As discussed later, other configurations can be used for adjustably setting the saddles 150 in particular placements on the base 140.

On the extreme ends of the base 140, the cradle 130 has end walls 146. In arrangements disclosed herein, spacer elements (not shown), which are discussed in detail below, can fit in the space between the end walls 146 and the saddles 150 to prevent movement of the saddles 150 outward as the cradle surfaces 160 hold the weight of the supported tower section. Such spacer elements can be used in combination with (or instead of) the extending pins 154 and apertures 144 shown here. As disclosed in more detail below, the spacer elements can include bars, plates, blocks, or the like of configured lengths to fit the adjusted positions of the saddles 150 relative to the end walls 146.

Looking next at the adjustable foot 130', FIGS. 9A-9E illustrate various views of a foot 130' of the disclosed modular assembly. The foot 130' is similar to the cradle 130 and has many of the same components so like reference numerals are used. The foot 130' has slots 142 or cutouts on its base 140 that slide over corresponding inner clips (122) on the bed (112) of the flatcar (110). The slots 142 can be reinforced as shown. The engagement between the slots 142 and the inner clips (122) restrain the foot 130' in the longitudinal and lateral planes.

Figure 10A:
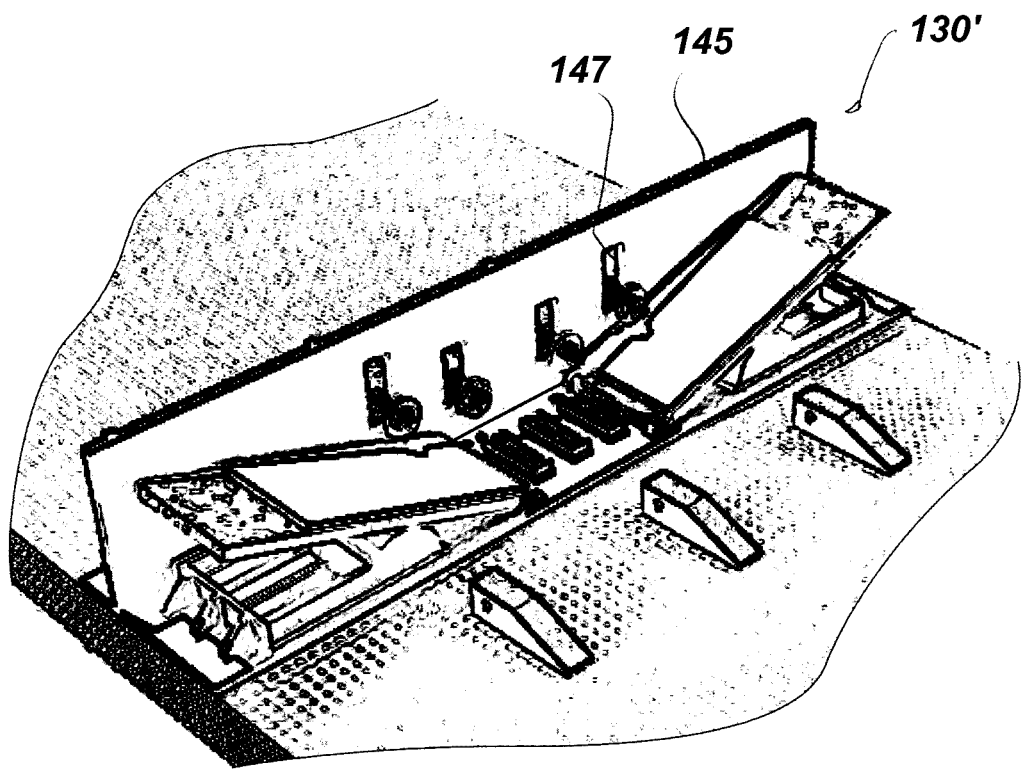
FIGS. 10A-10B illustrate perspective views of opposing sides of a foot disposed relative to tabs on the bed of a flatcar.
Figure 10B:
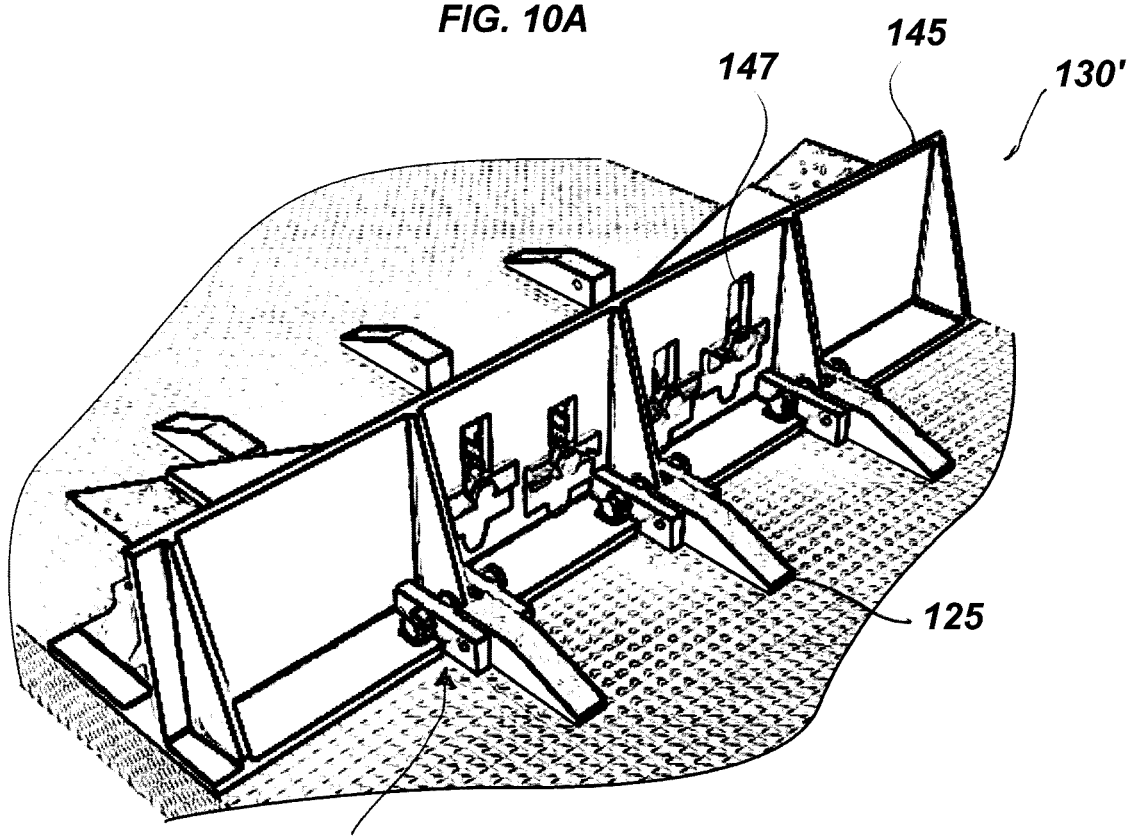

In addition to engaging the inner clips (122), the foot 130' can be affixed in locations to the outer clips (125). This affixing of the foot 130' to the outer clips (125) may be responsible for restraining the vertical force component required by transportation requirements; however, they may add additional reinforcement for the other required restraint vectors. As best shown in FIGS. 9A-9B, for example, the base 140 of the foot 130' extends beyond the sidewall 145 to accommodate supporting features. Hinge hole and slot arrangements 149 on the base 140 are used to affix the base 140 of the foot 130' to the outer clips (125) disposed on the flatcar's bed (112), as shown in FIG. 10B, using hinge pin and spacer arrangements.

The foot's base 140, which is shown in isolated views of FIGS. 11A-11B, has a sidewall or flange 145 extending therefrom. The sidewall 145 has a number of slots 147 for affixing with bolts to the bolt holes arranged on the end of a tower section (not shown). The size and placement of the slots 147 allow for the sidewall 145 to affix to different sized tower sections. To accommodate varying bolt hole positions in the tower section (not shown), for example, the sidewall 145 can have four cutouts 147 that allow bolts to run through the bolt holes in the tower sections. Load bearing plates (not shown) can be used on both sides of the sidewall 145 and the tower's flange to adapt the fixture between the cutouts and bolt holes. (FIGS. 10A-10B illustrates some example components of these features.)

Again, the foot 130' is similar to the cradle 130 and holds the weight of the tower section. Bolting to the sidewall 145 is used to restrain primarily the longitudinal load, but also to a lesser extent the lateral and vertical loads. In one example, the end of the tower section secures to the sidewall 145 with four grade "8" tool steel bolts that are prevented from backing out using grade "8" tool steel sheer plates. To increase the restraint, the tower section can be strapped down to the foot 130'. The combination of adjustable angle of the surfaces 160 and the different bolt securement positions enables the disclosed foot 130' to handle a number of tower diameters, tower lengths, bolt-hole sizes, and bolt-hole arrangements.

As noted above, tabs 154 on the saddles 150 can fit in apertures 144 in the base, and/or spacer elements can fit in the space between the end walls 146 and the saddles 150 to fix the saddles 150 and prevent movement outward as the cradle surfaces 160 hold the weight of the supported tower section. The spacer elements can be a large block, bar, rod, plate, or the like used to hold the saddle 150 in place.

Figure 12A:
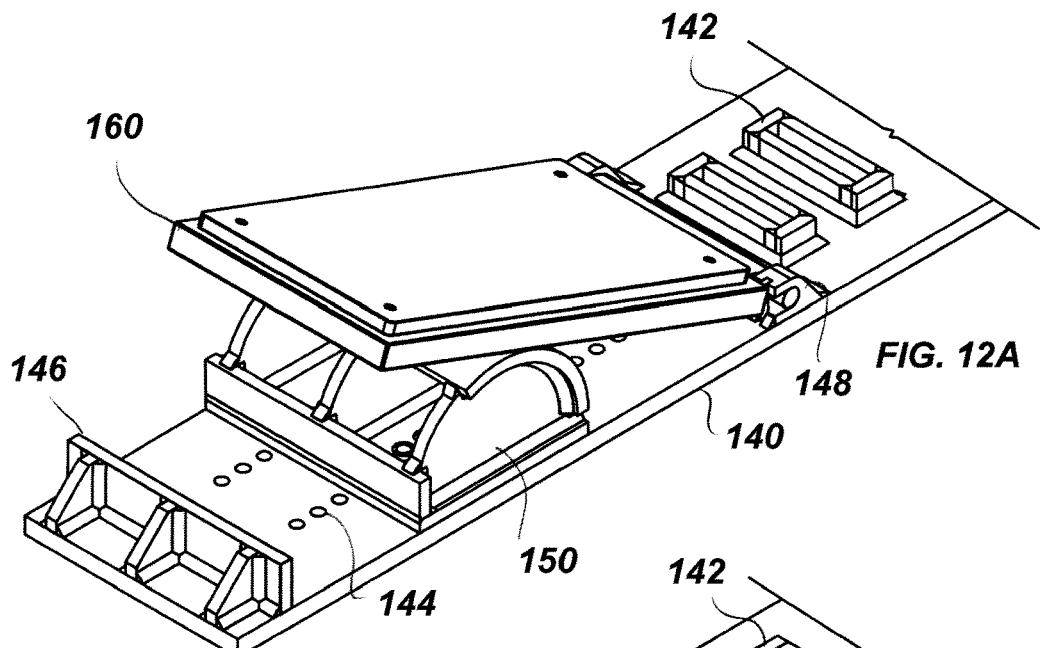
FIGS. 12A-12C illustrate three spacer arrangements according to the present disclosure for spacing the saddles on the base for the disclosed cradles and feet.
Figure 12B:
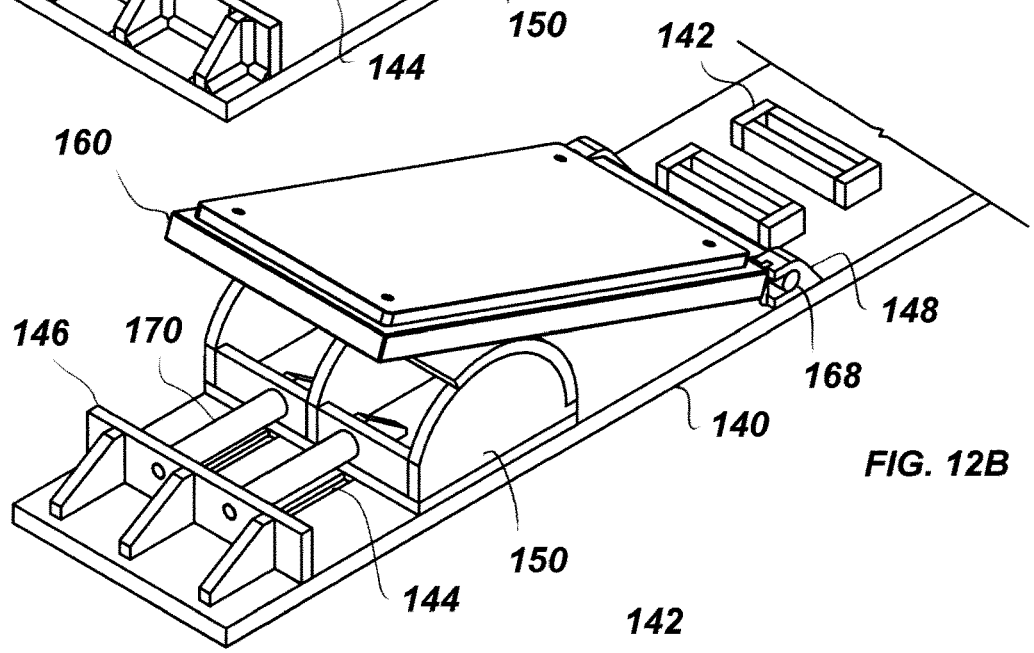
Figure 12C:
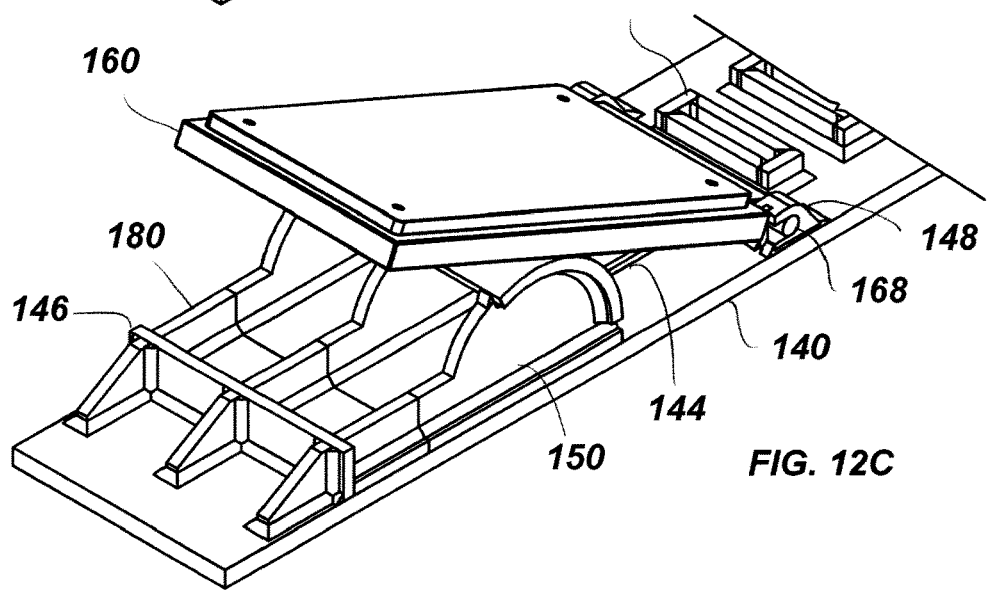

For example, FIGS. 12A-12C illustrate three arrangements according to the present disclosure for spacing the saddles 150 on the base 140 for the disclosed cradles 130 and feet 130'. In general, the base 140 has an edge, stop, or endwall 146 opposite to the hinges 148. One or more spacers (e.g., 170, 180) can be positioned between the endwall 146 and the saddle 150 to hold the saddle 150 in position on the base 140. Various spacers (e.g., 170, 180) of different lengths can be provided for adjusting the position of the saddle 150 on the base 140.

FIG. 12A shows the previously discussed arrangement in which tabs (154) on the saddle 150 adjustably position in apertures 144 in the base 140 to hold the saddle 150 in a set position. A reverse arrangement of tabs and apertures could be used so that the saddle 150 includes apertures and the base 140 in includes extending tabs.

Instead of the arrangement in FIG. 12A or used in conjunction therewith, FIG. 12B shows a first spacer arrangement for spacing the saddles 150 on the base 140 for the disclosed cradles 130 and feet 130'. In this first arrangement, spacer elements 170 in the form of bars fit in the space between the endwall 146 and the saddle 150.

Instead of the arrangement in FIG. 12A or used in conjunction therewith, FIG. 12C shows a second spacer arrangement for spacing the saddles 150 on the base 140 for the disclosed cradles 130 and feet 130'. In this second arrangement, a spacer element 180 in the form of a block or plate fits in the space between the endwall 146 and the saddle 150.

In each of these arrangements, the cradle surface 160 can receive the majority of the vertical load, while the saddles' tabs 158 (if present) and/or the spacer elements 170/180 (if present) absorb the lateral forces caused by the angled cradle surfaces 160. To change the angle of the cradle surfaces 160, the tab/aperture arrangement and/or the spacer elements 170/180 for the saddle 150 can be changed. The saddle 150 is moved to different apertures 144, and/or the spacer element 170/180 can be changed out for a different length element. The different spacer elements 170/180 can be color coded for ease of use in the field. If apertures 144 and tabs 154 are not used, then the bottom of the saddle 150 and the surface of the base 140 can use a configuration of longitudinal or lateral rails and tracks for the slots 144.

Although only one end is shown herein in FIGS. 12A-12C, the other end of the base 140 can be similarly configured. Once the saddles 150 are in place, gravity forces the cradle surfaces 160 down onto the saddles 150, which push out toward the endwalls 146. Once the system 100 is set up, there are no moving parts because all of the components are essentially held in place by their own weight and that of the load from the supported tower section.

FIG. 13 illustrates perspective, side, and end views of first spacer elements 170 for the saddle (150) on the base (140) of a cradle 130 or a foot 130'. Again, this first spacer element 170 is a bar 172 having tabs 174 on its ends. The bar 172 can have a particular length to space out the saddle (150) a particular distance on the base (140). A number of such bars 172 are formed in predetermined increments to adjust the angle of the cradle surfaces 160 to the required angle for the given tower diameter.

For example, FIGS. 14A-14B illustrate side and end views of a portion of a cradle 130 with bars 172 of a first length. Preferably, more than one bar 172 is used as shown. The tab 174 of the bar 172 fits in an aperture or slot in the endwall 146 of the base 140. The other tab 174 of the bar 172 fits in an aperture or slot in the saddle 150. The length of the bar 172 can then keep the saddle 150 a set distance from the endwall 146. This in turn places the cradle surface 160 at a given angle for a given radius $R_1$.

For comparison, FIG. 15 illustrates a side view of the portion of the cradle 130 with second bars 172 of a greater length. The saddle 150 is supported closer to the hinge 148 so the cradle surface 160 is at a greater incline for a smaller radius $R_2$, such as would support a tower section of smaller circumference.

Because the assembly 100 of the present disclosure is modular and can be assembled as needed for the various tapers, sizes, circumferences, lengths, and the like of the tower sections, several spacer elements 170 such as the bars 172 may be provided. FIGS. 16A-6B illustrate a container 175 holding various spacer bars 172 for the modular assembly. Several such containers 175 may be held on the flatcar (110) or stored separately so that the correct length bars 172 can be selected and used on the cradles (130) and feet (130').

The container 175 can have a pair of each pin size, and one container 175 can be used one each corner of the railcar (110) to carry pins 170 to set the foot 130' and cradle 130. The length of the pins 172 can come in 1" increments from 1" to 10", and the diameter of the pins 172 can be 2" along the load bearing length. The tabs 174 on the ends can be 1" long and have 1" diameter to secure the pin 172 in place. Other configurations could be used.

Figure 17:
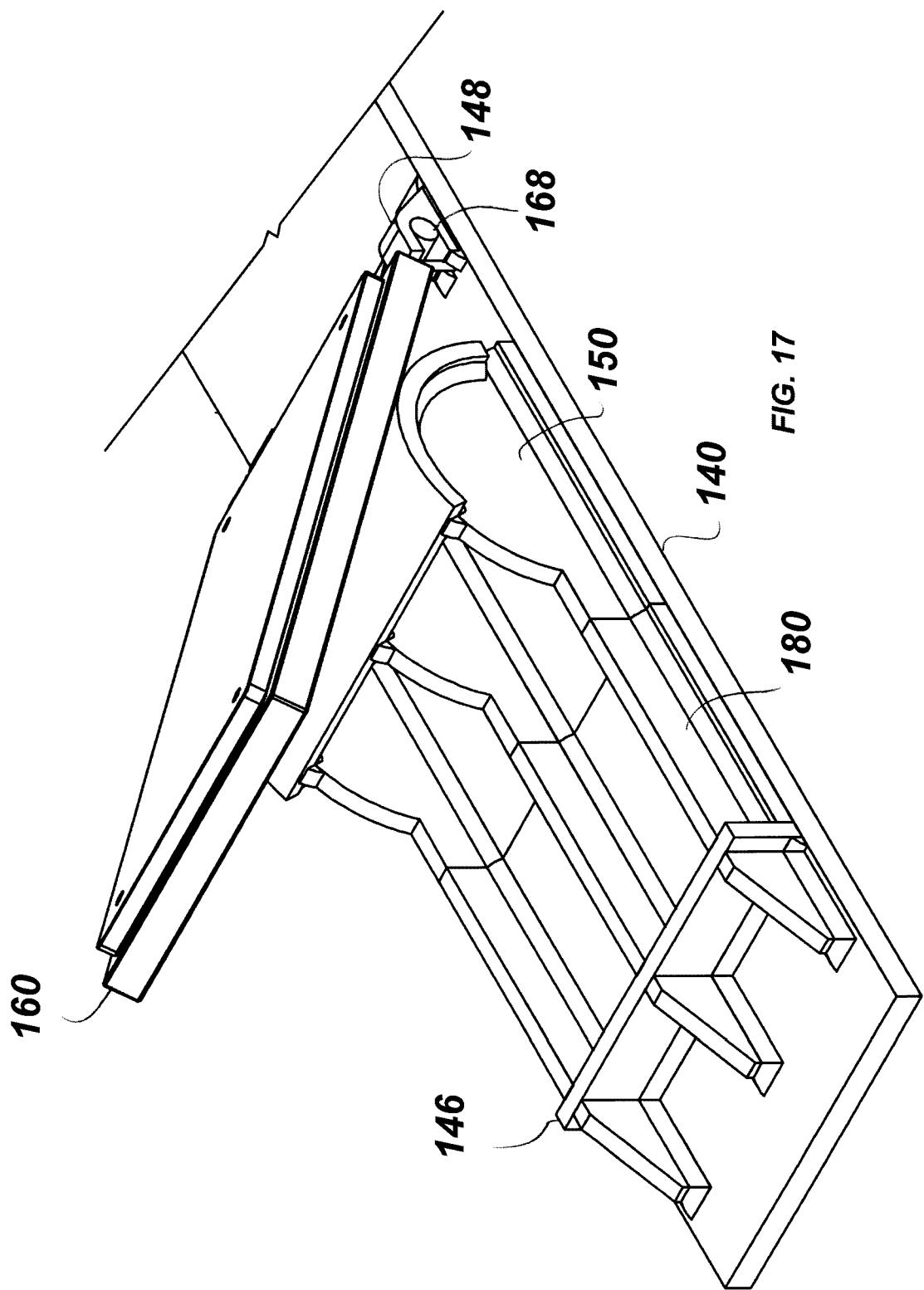
FIG. 17 illustrates a perspective view of a portion of a cradle with another type of spacer for the saddle.

For further illustration, FIG. 17 shows a perspective view of a portion of a cradle 130 with another type of spacer element 180 for the saddle 150. In this example, the spacer element 180 is a plate or block 182 that fits between the endwall 146 and the saddle 150. Tabs, lips, or the like (not shown) can be used to hold the plate 182 in place against the endwall 146 and the saddle 150. As will be appreciated with the benefit of the bar 172 of FIGS. 12B-12C and plate 180 of FIG. 17, the spacer elements for the cradle 130 and foot 130' can have a number of different configurations.

Figure 18A:
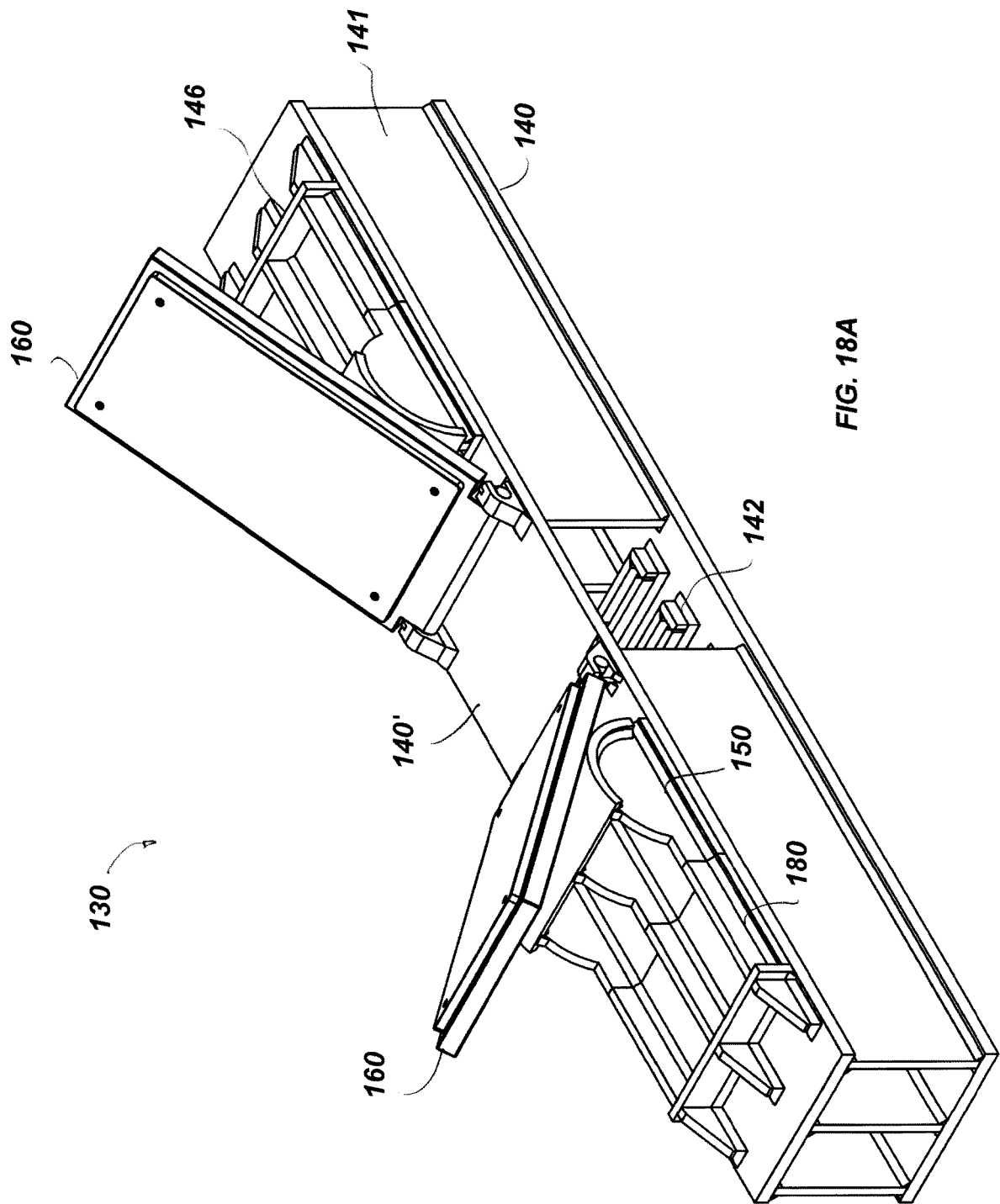

To accommodate reduced diameters of the taper of the tower section, the adjustable cradles 130 and feet 130' for the modular assembly 100 can be used with lifting platforms or can be preconfigured with lifted bases. For example, FIGS. 18A-18B illustrate perspective, plan, side, and end views of an elevated cradle 130 of the disclosed modular assembly 100. An elevated foot 130' can be similarly configured.

A lower base 140 rests against the flatcar's bed (112) and has the slots 142 for the inner clips (122). An upper base 140' is elevated from the lower base 140 by stands 141. The upper base 140' has the other elements of the cradle 130, such as the saddles 150, cradle surfaces 160, spacer elements 180, etc. The stands 141 as shown here can be permanently affixed between the bases 140/140' so that this cradle 130 is preconfigured as elevated. Also, the stands 141 can be separately affixable between the bases 140/140' using bolting and the like so that even the elevation of the cradle 130 and foot 130' can be modularly adjustable.

Figure 19:
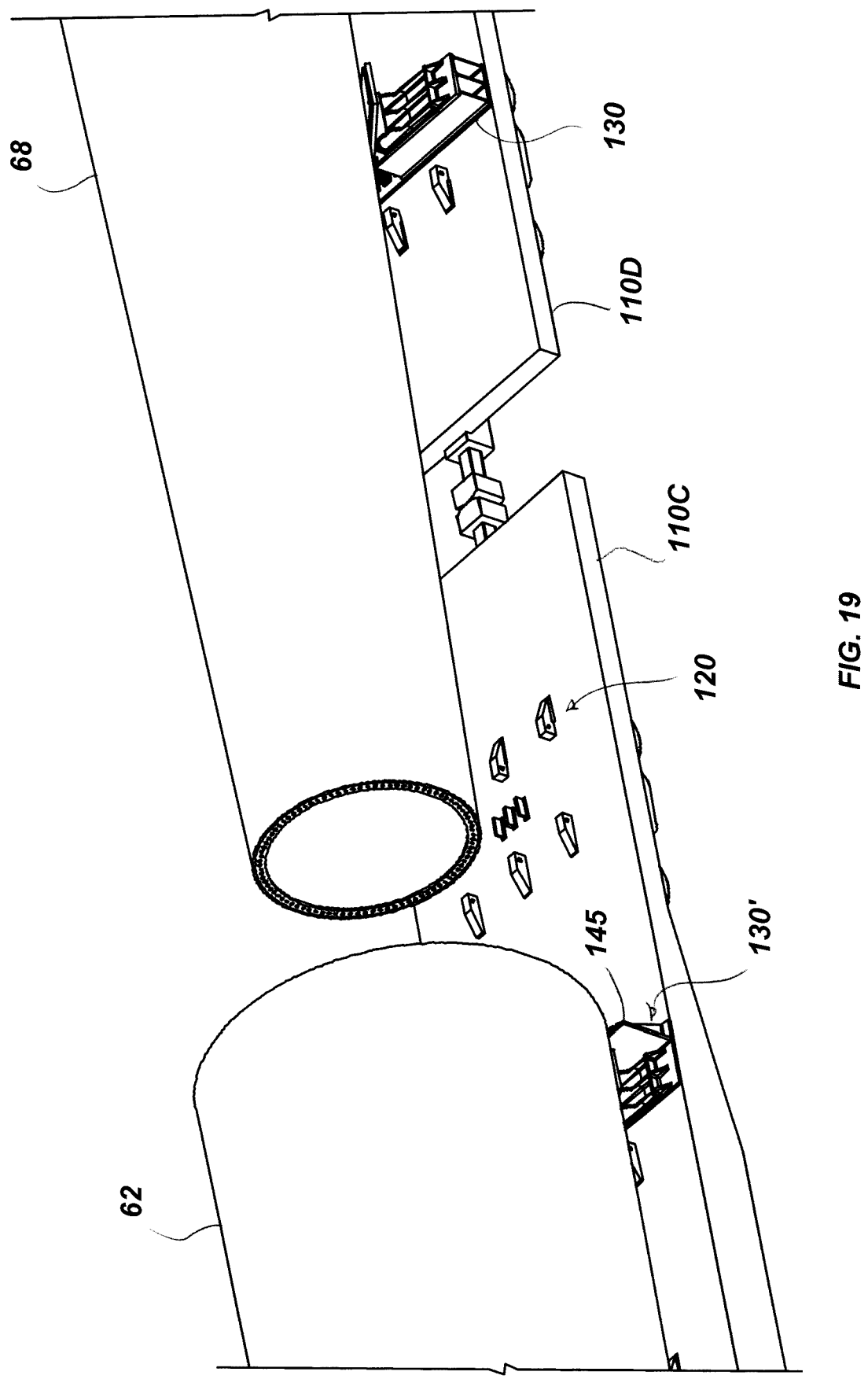
FIG. 19 illustrates the elevated cradle on a flatcar supporting a tower section.

FIG. 19 illustrates how the elevated cradle 130' can be used on a flatcar 110 to support a tower section with a smaller diameter taper. Although not expressly shown, an elevated foot 130' could be comparably configured like the elevated cradle 130. The elevated cradle 130 accommodates the large change in diameter at the narrow end of the tower section so that cradle's cradle surfaces 160 do not need to be raised to high angles that, why mathematically possible, may not be practical for most applications.

Figure 20:
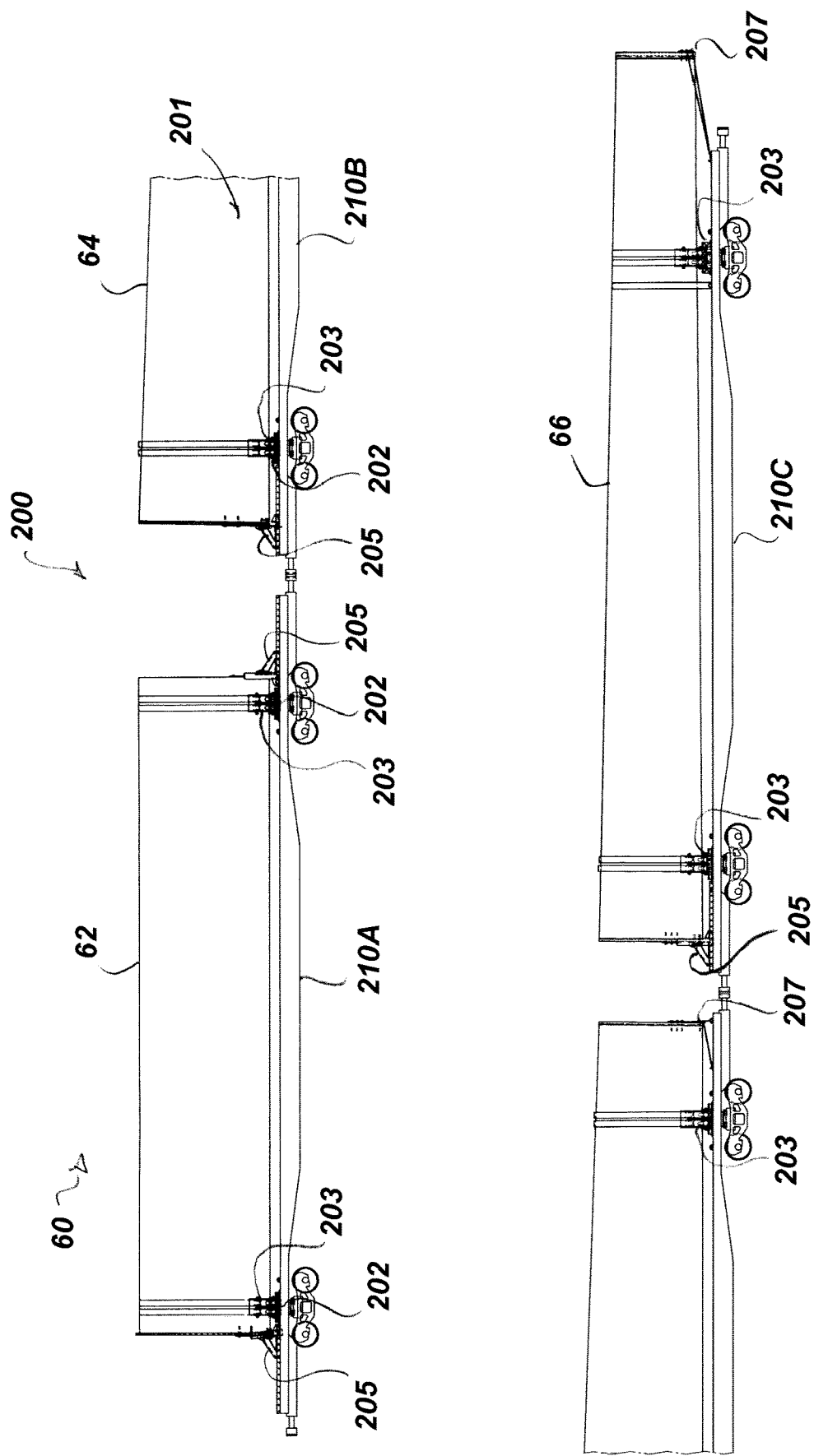
FIG. 20 illustrates another example of a modular assembly according to the present disclosure transporting sections of a tower assembly.

FIG. 20 illustrates another example of a modular assembly 200 according to the present disclosure for transporting sections of a tower assembly 60. This modular assembly 200 is similar to that disclosed above so that reference to comparable components, functions, and features disclosed above are incorporated herein with respect to the present assembly 200.

Again, transport devices 210A-D transport cylindrical items, namely tower sections 62, 64, and 66 of the tower assembly 60 for a wind turbine. The tower sections 62, 64, and 66 represent a type of heavy-lift and over-dimension cargo, which requires significant coordination and time to transport. Other tower assembles with other numbers of tower sections and lengths can readily be accommodated by the teachings of the present disclosure.

Again, the tower sections 62, 64, and 66 can be transported by rail so that the transport devices 210A-D can be railcars for transporting the tower assembly 60 by rail. The railcars include a first flatcar 210A supporting a lower tower section 62, a second flatcar 210B supporting an intermediate tower section 64, and a third flatcar 210C supporting a top tower section 66. As is typical, various ones of these tower sections 62, 66, and 64 may taper from its base end to its top end.

The base tower section 62 loaded onto the first flatcar 210A and the intermediate tower section 64 loaded on the second flatcar 210B do not take up the full length of the cars' beds 112. The upper tower section 66 may extend a length longer than the bed 212 of the third flatcar 210C. As will be appreciated, the tower assembly 60 may have more or less sections, and they can be arranged in a different order as the case may be. Likewise, more or less flatcars 210 can be used depending on the implementation.

Each of the flatcars 210A-C can accommodate at least one of the tower sections 62, 64, and 66 thereon using a plurality of supports 201 of the assembly 200. In general, the modular system 200 for transporting a tower section on the bed 121 of a transport device (i.e., flatcar 210) includes end supports 205, 207 and includes at least one intermediate support 203. The end supports 205, 207 generally include sleds, feet, and anchors, while the intermediate support 203 generally includes a cradle support. Each of the end supports 205, 207 are disposed on the bed 212 and are affixed to one end of the tower section. At least one of the end supports 205, 207 is longitudinally adjustable relative to the bed 212 to accommodate the varying longitudinal length of the given tower section. The at least one intermediate support 203 is disposed on the bed 212 and supports portion of the tower section. The at least one intermediate support 203 has a cradle being adjustable circumferentially against which the tower section rests. The adjustable cradle of the at least one intermediate support 203 allows it to accommodate the varying circumference of the given tower section.

On each flatcar 210 for each tower section, the supports 201 include a plurality of bed supports 202 affixable at support locations on the beds 212 of the flatcars 210. The at least one intermediate or cradle support 203 is engageable to the bed supports 202. In this way, the at least one cradle support 203 is positionable at one of the support locations in a modular fashion to support the tower sections 62, 64, and 66 on the beds 112 of the flatcars 210A-C.

As noted, the at least one cradle support 203 has an adjustable cradle against which the tower section 62, 64, and 66 rests. The adjustable cradle can be adjusted on each cradle support 203 between a plurality of circumferential dimensions, which can be set to the particular circumference of the tower section 62, 64, and 66 being supported.

On each flatcar 210 for each tower section, the supports 201 also include at least one foot 205 affixable to an end of the tower section supported on the bed 212 of the flatcar 210. For those tower sections that are too long, the supports 201 can include an anchor support 207 affixable to another end of the tower section.

To discuss the various supports 201, support locations 202, cradle support 203, feet 205, anchor support 207, etc., reference is made to FIGS. 21A through 24C, which illustrate features on each of the flatcars 210A-C of FIG. 20. Turning first to FIGS. 21A-21C, a side view, a plan view, and an end view are illustrated of a first of the flatcars 210A of the present disclosure configured with components of the modular assembly 200 to support a tower section 62.

The flatcar 210 has a bed 212 supported with trucks 213 and having couplings 215. The bed 112 has a number of bed supports 202 at locations where the tower section can be supported on the bed 212. At least two support locations having the bed supports 202 are provided on the bed 212; however, preferably a number of support locations with bed supports 202 may be provided so various lengths of tower sections can be supported in different ways on the same flatcar 210A. Although not strictly necessary in all implementations, it may be preferred to locate one or more of the bed supports 202 over the rail trucks 213 so the weight of a supported load (i.e., tower section) may be more directly transferred to the underlying rails.

Two cradle supports 203 disposed on the bed supports 202 are used to support the tower section 62 near both ends, and straps 216 extending from sides of the cradle supports 203 wrap around portions of the tower section 62. The bed supports 202 include bed fixtures 220 for supporting the cradle supports 203. Opposing bed fixtures 220 at the edges of the bed 212 affix to the ends of the cradle support 203 to restrain it both laterally and longitudinally on the bed 212.

As shown in FIG. 21B, for example, ends of an adjustable cradle 230, which is discussed in more detail below, can fit in the opposing set of bed fixtures 220 on the bed 212. Preferably, at least one opposing set of bed fixtures 220 is affixed at each end of the bed 112, but more can be placed in intermediate locations between them to provide selective support locations. These low profile bed fixtures 220 mounted on the bed 212 are preferred for transferring the weight of the tower section onto the flatcar's bed 212. (Depending on the weight of the transported item, however, it may be possible for one or more of the intermediate cradle supports 203 to be adjustably mounted on rails 206 in a manner similar to the end supports 205. Likewise, it may be possible for one of the end supports 205 adjustably mounted on the rails 206 to also include cradle surfaces similar to those disclosed herein.)

As shown in the detail of FIG. 21C, the bed fixture 220 has tabs or clips 222, 224 affixed toward the edge of the flatcar's bed 112. A sidewall tab 222 is disposed on the bed's edge and has openings 226 for affixing to the end of the cradle support 203 with bolts or other fasteners. Endwall tabs 224 extend orthogonally from the sidewall tab 222 and have openings 228 for affixing to the end of the cradle support 203 with bolts or other fasteners. The sidewall and endwall tabs 222, 224 create a slot or pocket in which the end of the cradle support 203 positions. In general, the tabs 220, 224 can be welded, bolted, or otherwise permanently affixed to the bed 112, or they can be affixed to a base plate (not shown) that in turn is affixed to the bed 112.

Elsewhere on the bed 212, the bed supports 202 can include eyelet loops 214 or similar lashing features affixed to the bed 212 adjacent the bed fixtures 220. Straps or tie downs (not shown) can be used with these eyelet loops 214 to lash the tower section 62 on the cradles 230. The cradles 230 also include features for straps or tie downs 216 to lash the tower section 62 on the cradles 230.

This tower section 62 has a length that allows it to fit on the bed 212 of the flatcar 210A. Accordingly, the supports include feet 205 at opposing ends of the tower section 62 to restrain the section 62. The bed supports 202 for these opposing feet 205 include rails 206 disposed at each end of the bed 212 for adjustably affixing to the feet 205, which are discussed in more detail below. The rails 206 can be welded, bolted, or otherwise affixed to the bed 212. To accommodate the various lengths of the tower section, the position of the foot 205 on the rails 206 can be adjusted, and the foot 205 can be affixed in place with bolts or other fasteners. For their part, the feet 205 can affix directly with bolts or the like to ends of the tower section 62, which typically already have a bolting arrangement used for assembly of the tower.

The flatcar 210 can be prepared ahead of time and can be reused as necessary. In one embodiment, the flatcar 210 can be a four axle, 89-ft. flat deck railcar. As configured, the flatcar 210 has all the prepositioned support locations 202 to allow the cradle supports 203 and the feet 205 to be moved based on varying lengths of tower sections. In this way, a given tower section sits in the cradle supports 203 and affixes to the feet 205, which can be adjusted for varying diameter sections. The cradle supports 203 can be moved to any of the pre-set bed fixtures 202, and the feet 205 can be adjusted along the rails 206 to accommodate various diameters and lengths of tower sections.

FIGS. 22A-22D illustrate a side view, a plan view, and opposing end views of another flatcar 210B of the modular assembly 200. As opposed to the previous example, the tower section 64 here is nearly as long as the bed 212. Therefore, a cradle support 203 and a foot 205 support one end of the tower section 64, while a cradle support 203 and an anchor 207 support the other end of the tower section 61. In fact, the bed 212 at this other end may or may not include rails (206) for a foot (205), although it could.

FIG. 22C shows the end of the tower section 64 supported by the foot 205 affixed to the rails 206. Side lines 208 can affix from the bed 212 to anchors 209 attached to the edge of the tower section 64. By contrast, FIG. 22D shows the other end of the tower section 64 supported by the anchor arrangement 207. Here, side lines 208 affix from the bed 212 to anchors 209 attached to the edge on opposite sides of the tower section 64. More centrally located to prevent longitudinal movement, centralized lines 208' can affix from the bed 212 to a centralized anchor 209' attached to the bottom of the edge of the tower section 64. As shown, the anchor support 207 can use lines 208 in the form of straps, cable, cord, rope, etc. and can attach the lines 207 to plates as the anchors 209 bolted to the bolting arrangement on the tower section's ends.

FIGS. 23A-23C illustrate a side view, a plan view, and an end view of the other flatcar 210C of the modular assembly 200. As opposed to the previous examples, the tower section 66 here is longer than the bed 212. Therefore, a cradle support 203 and a foot 205 support one end of the tower section 66, while a cradle support 203 and an anchor support 207 support the other end of the tower section 66. In fact, the bed 22 at this other end may or may not include rails 206 for a foot 205, although it could.

Overall, the foot 205 and anchor support 207 for this longer tower section can be similar to that discussed previously. In some differences, additional lashing 218 can be used to support the tower section 66, especially at its tapered end. Additionally, the cradle support 203 at the tapered end may be elevated or higher to account for the smaller diameter of the section 66 at this tapered end. Further details of an elevated cradle support 203 are discussed later.

FIGS. 24A-24C illustrate a side view, a plan view, and a cross-sectional end view of an alternative flatcar 210C of the modular assembly 200. Again, the tower section 66 here is longer than the bed 202. Therefore, a cradle support 203 and a foot 205' support one end of the tower section 66, while a cradle support 203 and an anchor support 207 support the other end of the tower section 66.

As shown here, the foot 205' is not adjustable on rails as in previous arrangements. Instead, the foot 205' is directly affixed at a support location to the bed 212. In general, the fixed foot 280 can be similar to what is disclosed previously with reference to FIGS. 9A-9B. The fixed foot 280 has a base 282 that affixes to the bed 212 of the flatcar 210. A flange 286 extends from the base 280 and has slots 288 for attaching by bolts and the like to the bolting arrangement on the end of the tower section in a manner similar to the foot discuss previously. The fixed foot 280 can also have pivotable cradle surfaces 284 on which the end of the tower section can rest.

As this example indicates, any one or more of the given feet 205' used on the flatcars 210 can have a fixed position, while any foot 205 for the other end can be used adjustable on rails 206 (or an anchor support 205 for the other end can be used for adjustment instead).

Figure 25A:
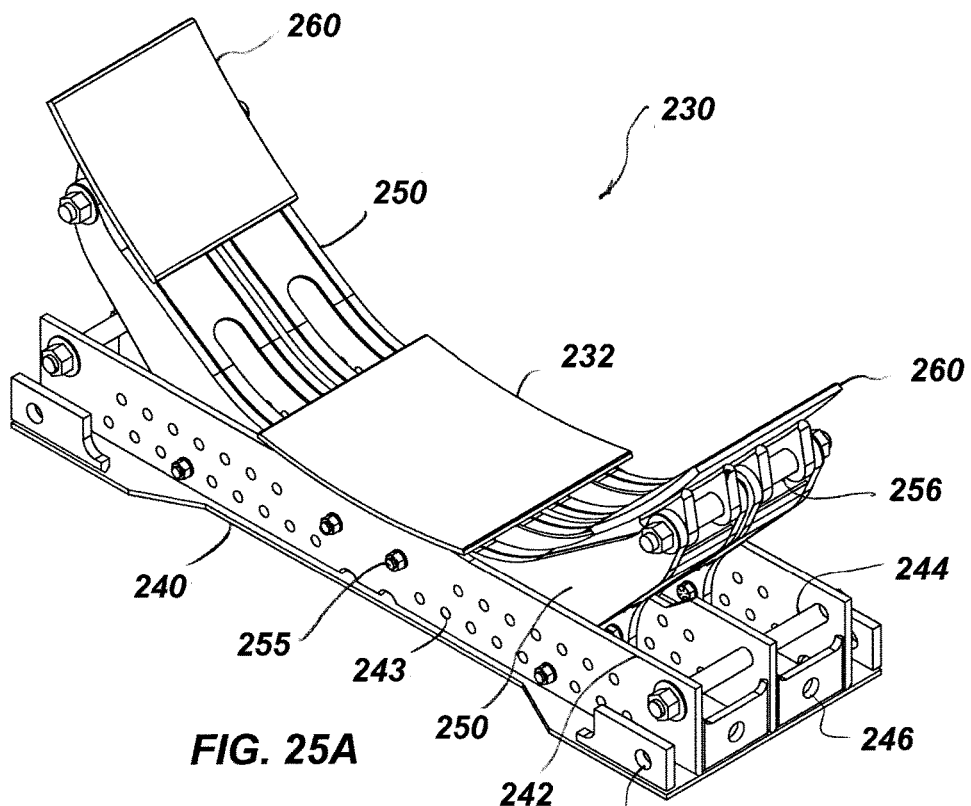
FIGS. 25A-25B illustrate a perspective view and a side view of a cradle of the disclosed modular assembly.
Figure 25B:
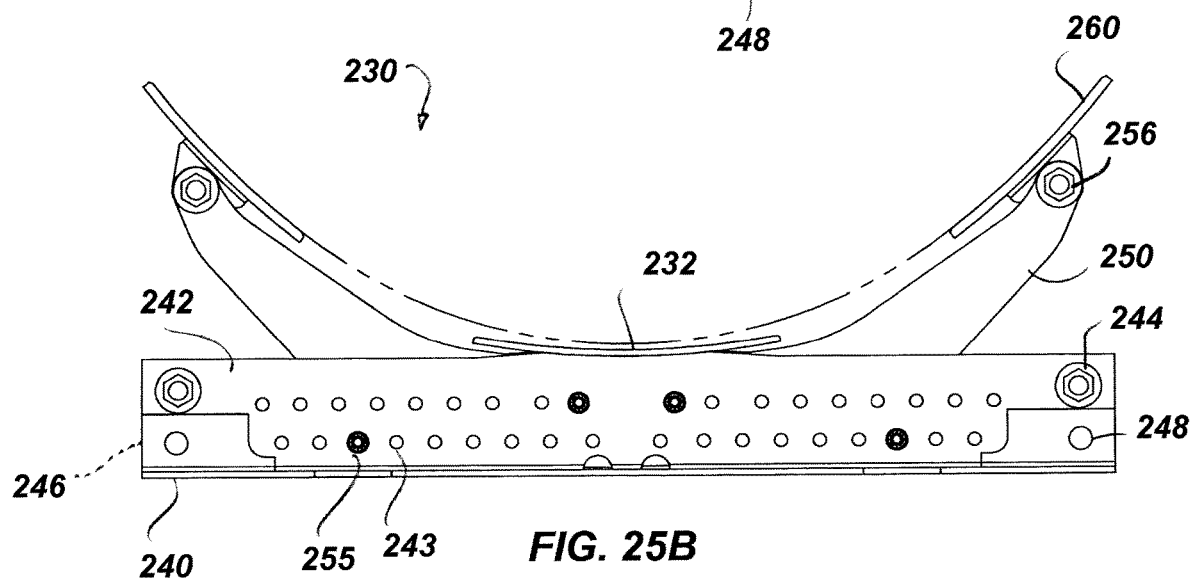

Having an understanding of the various supports 202 and other features of the flatcars 210, discussion now turns to particulars of several of these components. Looking now at the adjustable cradle 230, FIGS. 25A-25B illustrate a perspective and a side view of an adjustable cradle 230 of the disclosed modular assembly. In general, the cradle 230 has a base 240 that sets on the bed (212) of the flatcar (210). Opposing ends of the base 240 affix to the sidewall tabs (not shown) of the bed supports (220) to hold the cradle 230 in place. In particular, sidewalls on the base 240 have fastener openings 248 to receive bolts to affix to the sidewall tabs of the bed supports (220), and endwalls on the base 240 have openings 246 to receive bolts to affix to the endwalls tabs of the bed supports (220).

As before, the cradle 230 has a hinge 256 that positions adjacent the bed (212) of the flatcar (210) and supports an end of a cradle surface 260 of the adjustable cradle 230. Additionally, a saddle 250 is positioned on the base 240 between the bed (212) and the cradle surface 260 and is adjustable relative to the hinge 256 to adjust an angle of the cradle surface 260 relative to the bed (212). The hinge and saddle arrangement are mirrored on an opposing end of the cradle 230 so that an opposing angle of another cradle surface 260 can be adjusted relative to the bed (212) in a comparable manner.

Figure 27A:
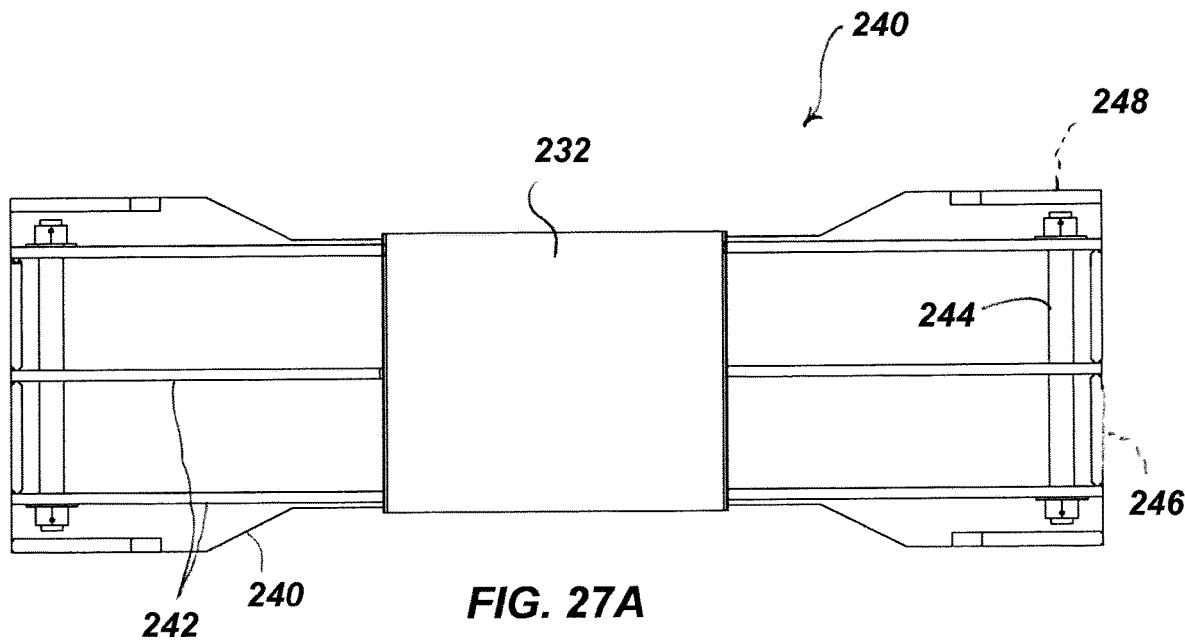
FIGS. 27A-27C illustrate a side view, a plan view, and an end view of a base of the disclosed cradle.
Figure 27B:
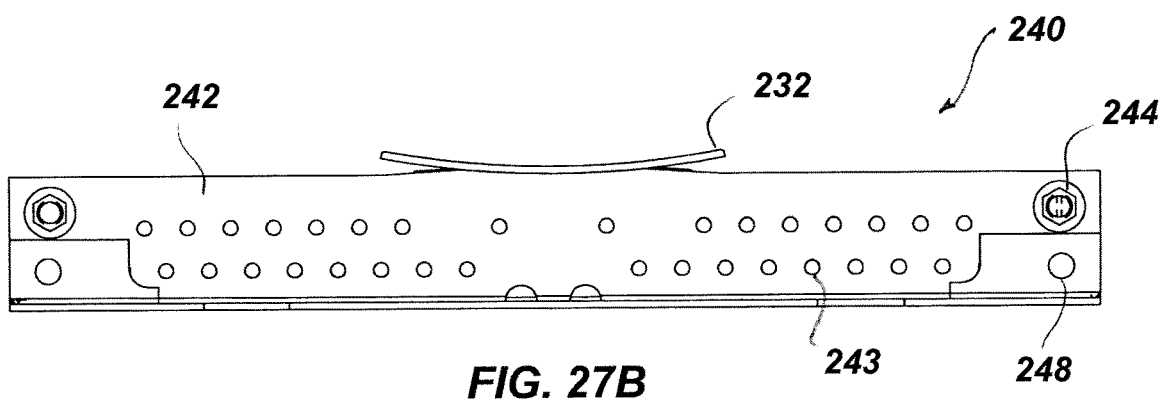
Figure 27C:
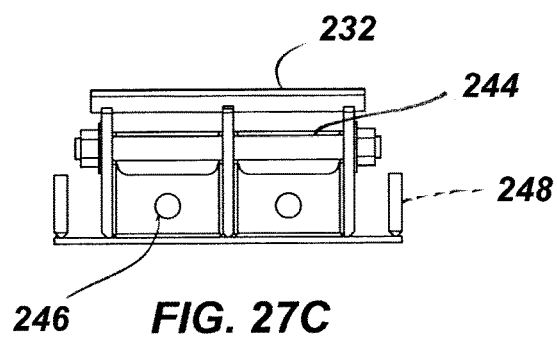
Figure 29D:
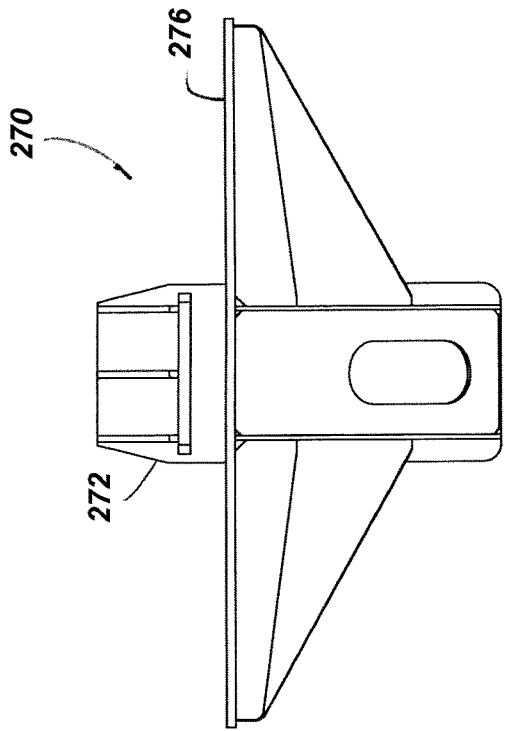
FIGS. 29A-29D illustrate a perspective view, a front view, a side view, and a plan view of an adjustable foot of the disclosed assembly.
Figure 29A:
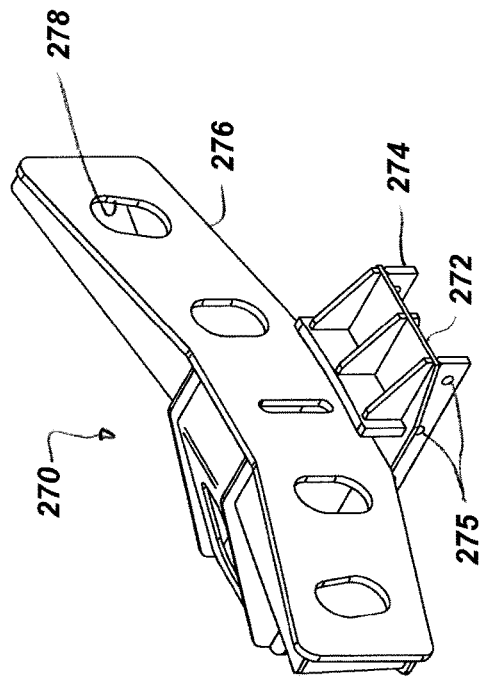
Figure 29C:
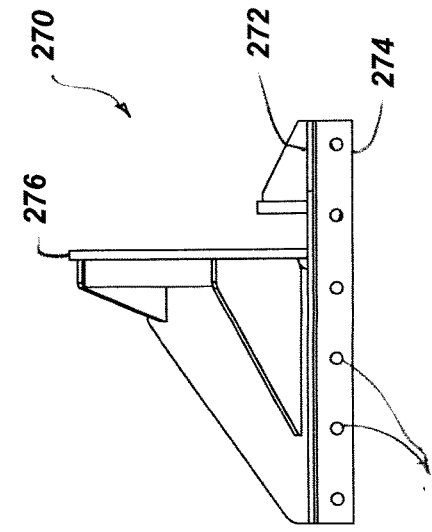
Figure 29B:
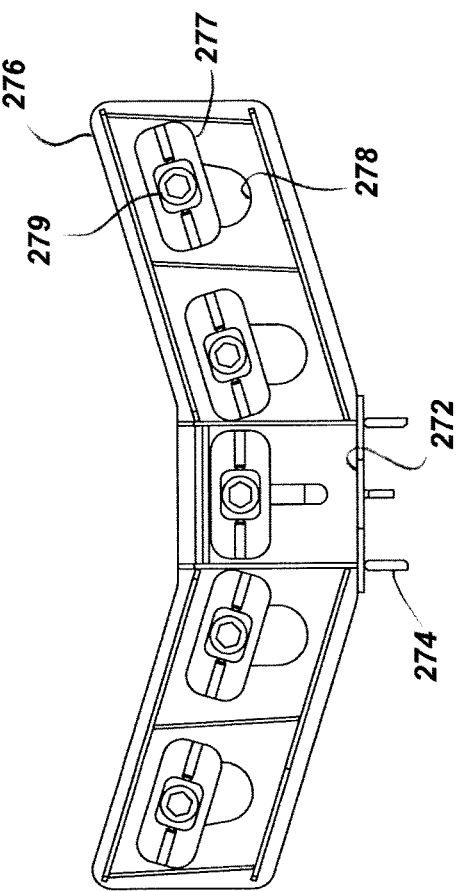

In particular, the base 240 has at least two struts 242 running along its length from end to end. (FIGS. 27A-27C illustrate isolated views of the base 240 for the disclosed cradle 230.) Here, three struts 242 are shown—one inner and two outer. At the outer ends, pins 244 pass through the struts 242 to provide attachment points for any lashing to be used.

Along both ends, each of the struts 242 has two rows of fastener openings 243 to receive bolts to affix the saddles 250 in place on the base 240. The saddles 250 positioned on opposing ends of the base 240 hold up the cradle surfaces 260 pivoted on the hinges 256. The saddles 250 can adjustably positioned on the base 240 along the length of the struts 242, aligning slots/holes in the saddles 250 with the fastener openings 243 in the struts 242 to receive tabs/bolts 255. (As noted above, other arrangements using tabs, slots, pins, bolts, openings, and the like can be used to adjustably position the saddle 250 on the base 240.) The saddles 250 having the cradle surfaces 260 attached with the hinges 256 to the upper ends of the saddles 250 allow the surfaces 260 to pivotably adjust to the outer dimension of the tower section. In this way, the opposing saddles 250 facing inward toward a central pad 243 on the base 240 can adjust the dimension, circumference, and the like of the cradle surfaces 260 for supporting a tower section. (For comparison, FIGS. 26A-26B illustrate end views of the cradle 230 of the disclosed modular assembly 200 with the saddles 250 in two adjusted states to accommodate tower sections 61A-B having different diameters.)

In arrangements disclosed herein, protruding tabs on the bottom of the saddles 250 can install in slots in the base (240). Also, spacer elements (not shown) could fit in the space between the cradle's endwalls and the saddles 250 to prevent movement of the saddles 250 outward as the cradle surfaces 260 hold the weight of the supported tower section.

Such spacer elements can be used in combination with (or instead of) the bolts 255, pins, or the like and the strut openings 243 shown here. As disclosed herein, the spacer elements can include bars, plates, blocks, or the like of configured lengths to fit the adjusted positions of the saddles 250 on the base 240.

FIGS. 28A-28D illustrate various views of the saddle 250 for the disclosed cradle (230). The saddle 250 has adjacent members 252 that set in the base (240) between the struts (242). Each of the adjacent members 252 are comprised of adjacent plates interconnected to one another. Each has bearing surfaces or ends 254 against which the cradle surface 260 rests. On its underside, the cradle surface 260 has trussets 266 that align with pivot openings on the saddle's bearing ends 254 for insertion of the hinge 256 about which the cradle surface 260 can pivot. On its exposed side, the cradle surface 260 can have a pad 262 of protective material, such as rubber, neoprene, or the like, against which the surface of the tower section rests.

As noted, the base (240) and the saddle 250 can have a plurality slots or fastener openings to receive bolts (255) or the like to hold the saddle 250 in position on the base (240). For that purpose, the saddle 250 has a number of fastener openings 253 defined in the plates of the saddle 250 to adjustably align with the openings (243) in the base (240). Several openings 253 are provided to allow for a number of alignable arrangements of the saddle 250 to the base (240).

FIGS. 29A-29D illustrates a perspective view, a front view, a side view, and a plan view of an adjustable foot 270 of the disclosed assembly. A base 272 of the foot 270 has tracks 274 with holes 275 along their length to affix to the rails (206) on the bed (212) of the flatcar (210). A flange 276 extending from the base 272 has a number of slots 278 for affixing with bolts to the bolt holes arranged on the end of a tower section (not shown). The size and placement of the slots 278 allow for the flange 276 to affix to different sized tower sections. To accommodate varying bolt hole positions in the tower section (not shown), for example, the flange 276 can have four slots 278 that allow bolts 279 to run through the bolt holes (not shown) in the tower sections. Load bearing plates 277 can be used with the bolts 279 on both sides of the flange 276 to adapt the fixture between the slots 278 and the bolt holes (not shown) on the end of the tower section.

Bolting to the flange 276 is used to restrain primarily the longitudinal load, but also to a lesser extent the lateral and vertical loads. In one example, the end of the tower section secures to the flange 276 with four grade "8" tool steel bolts 279 that are prevented from backing out using grade "8" tool steel sheer plates 277. To increase the restraint, the tower section can be strapped down as noted. The combination of adjustable cradle 230 and the different bolt securement positions of the foot 270 enables the foot 270 to handle a number of tower diameters, tower lengths, bolt-hole sizes, and bolt-hole arrangements.

As noted, some tower sections may taper so that a cradle support 203 on one of the ends may be elevated. FIGS. 30A-30C illustrate an elevation arrangement for the disclosed cradle. A pad 290 composed of struts 292 and cross-braces 294 has end and side openings 296, 298 for affixing with bolts 221 to the tabs of the support locations 220. As shown in FIG. 30A, the base 240 of the cradle 230 rests on the pad 290 so that the cradle surfaces 260, the saddles 250, and the like can be elevated a height off of the bed 212. The tabs of the support locations 220' can be increased in height to accommodate the combined thickness of the pad 290 and the base 240 and to accept two sets of bolts 221.

As disclosed herein, the module system 200 for transporting a tower section of a wind turbine includes a transport device, end supports, and at least one intermediate support. In previous examples, the transport device 210A of FIG. 21A included two intermediate supports 203 and two adjustable end supports 205; the transport device 210B of FIG. 22A included two intermediate supports 203 and two adjustable end supports 205, 207; the transport device 210C of FIG. 23A included two intermediate supports 203 and two adjustable end supports 205, 207; and the transport device 210C of FIG. 23A included two intermediate supports 203, one fixed end support 205', and one adjustable end supports 207. These configurations may be best suited for supporting cylindrical items such as the tower sections noted herein based on the weight and size of the tower sections and the flatcars of the transport devices 210.

Other configurations are possible depending on the type, size, weight, etc. of cylindrical item to be transported and depending on the type, size, etc. of the transport device 210 to be used. To that end, FIGS. 31A-31E show a number of other possible configurations. Each of these configurations include a transport device 210 that may include a flatcar, although other devices could be used. Each of the configurations is used for transporting a cylindrical item 61, such as a tower section or the like.

Figure 31A:
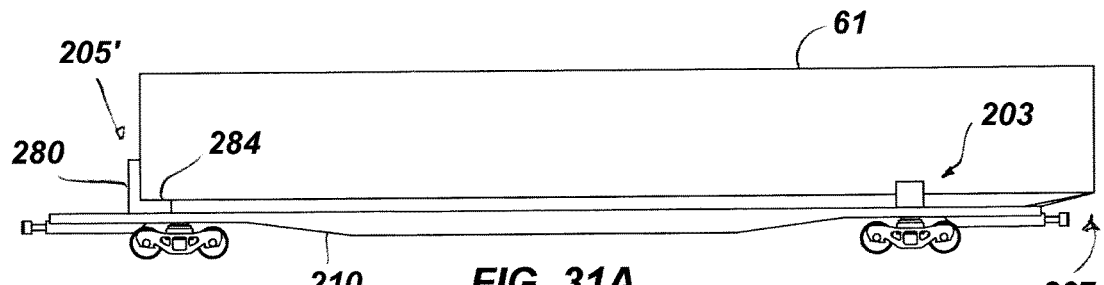
FIGS. 31A-31E show a number of other configurations for the disclosed modular assembly.
Figure 31B:
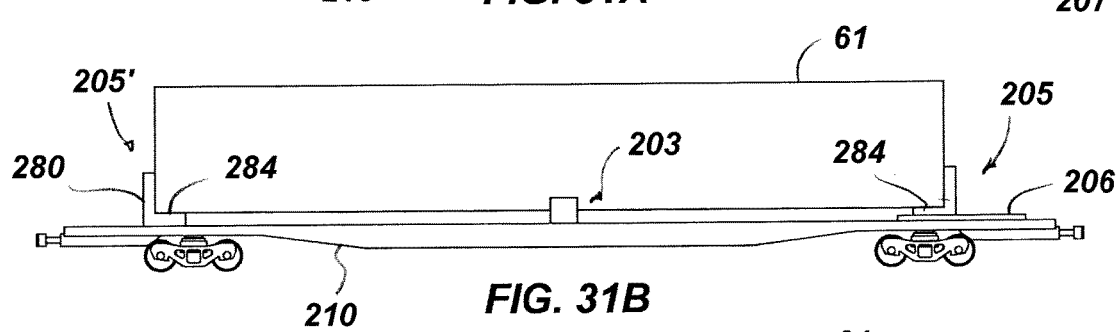
Figure 31C:
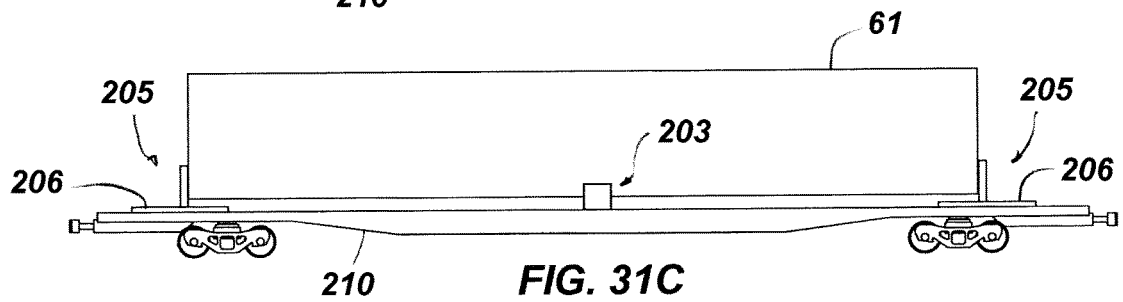
Figure 31D:
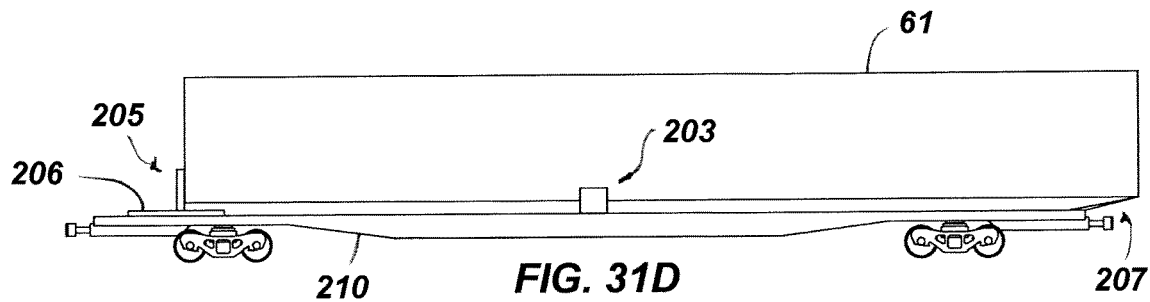
Figure 31E:
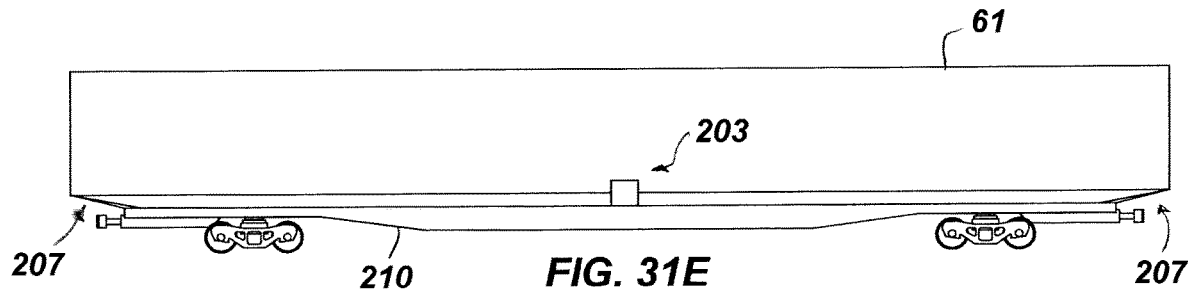

In FIG. 31A, the transport device 210 includes at least one intermediate support 203, one fixed end support 205' (e.g., fixed flange 280 with adjustable cradle surfaces 284), and one adjustable end support 207 (e.g., anchor support). In FIG. 31B, the transport device 210 includes at least one intermediate support 203, one fixed end support 205' (e.g., fixed flange 280 with adjustable cradle surfaces 284), and one adjustable end support (e.g., flange 205 having adjustable cradle surfaces 284 and movable on rail 206). In FIGS. 31C-31D, the transport devices 210 include at least one intermediate support 203 and two adjustable end support 205 and/or 207. These and other configurations are possible depending on the implementation.

The teachings of the present disclosure facilitate the transportation of large towers and tower sections used in conjunction with wind turbines. The term "tower," "tower section," and the like may be generally interchangeable in the present disclosure.

The modular system 100 uses mounting fixtures that include supports 101/201, intermediate supports 103/203, adjustable cradles 130/230, end supports 205/205'/207, feet 130'/270/280, bed supports and preconfigured support locations 102/120/120'/202/206/214/220 that can accommodate various tower dimensions and arrangements. The cradles 130/230, feet 130'/270/280, and the like can be reusable on the same or other transport devices or railcars to transport other tower sections or the like. The reusable cradles 130/230 and feet 130/270/280 do not require welding and cutting on railcar beds, which reduces the time to load tower sections on the railcars.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

Various details of loads, materials, strengths, forces, and the like are omitted in the description, but would be appreciated by one skilled in the art having the benefit of the present disclosure. Although expressly described for use with tower sections, the assembly 100 can be used to transport any type of cylindrical items, including drums, pipes, stacks, etc.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A method of transporting a tower section of a wind turbine, the tower section having a longitudinal length and a circumference, the method comprising:
   positioning end supports at end locations on a bed of a transport device;
   positioning at least one intermediate support at at least one intermediate location on the bed of the transport device;
   adjusting at least one of the end supports as at least one adjustable end support in a longitudinal direction to accommodate the longitudinal length of the tower section;
   loading the tower section on the transport device by supporting a circumference of the tower section on pivoting cradle surfaces pivotable about longitudinal pivots disposed on opposing cradle saddles;
   accommodating differences in the circumference of the tower section along the longitudinal length of the tower section by:
      adjusting a lateral separation between the longitudinal pivots disposed on the opposing cradle saddles, the opposing cradle saddles being moveable in a lateral direction on the at least one intermediate support against which the tower section rests and the opposing cradle saddles attaching to a base component of the at least one intermediate support; and
   allowing the pivoting cradle surfaces to pivot in a radial direction about the longitudinal pivots, wherein the longitudinal pivots are attached to the opposing cradle saddles without attaching to the base component of the at least one intermediate support; and
   affixing the tower section to the end supports.

2. The method of claim 1, wherein to position the end supports at the end locations on the bed of the transport device, the method comprises affixing a rail longitudinally on the bed for the at least one adjustable end support.

3. The method of claim 2, wherein adjusting the at least one of the end supports as the at least one adjustable end support to accommodate the longitudinal length of the tower section comprises adjustably affixing a flange at a longitudinal position on the rail.

4. The method of claim 3, wherein affixing the tower section to the end supports comprises affixing the flange to one end of the tower section.

5. The method of claim 1, wherein to position the at least one intermediate support at the at least one intermediate location on the bed of the transport device, the method comprises affixing sets of opposing bed supports on the bed of the transport devices at the at least one intermediate location.

6. The method of claim 5, wherein affixing the sets of the opposing bed supports comprising affixing one or more tabs extending from the bed of the transport device at the at least one intermediate location.

7. The method of claim 1, wherein adjusting the at least one of the end supports as the at least one adjustable end support to accommodate the longitudinal length of the tower section to support the tower section with the at least one end support comprises attaching at least one anchor to an end of the tower section; and connecting the anchor by a line to the bed of the transport device.

8. The method of claim 1, comprising lashing the tower section to the at least one intermediate support.

9. The method of claim 4, further comprising attaching at least one anchor to another end of the tower section; and connecting the anchor by a line to the bed of the transport device.

10. A method of transporting a tower section of a wind turbine on a bed of a transport device, the tower section having a longitudinal length, a circumference, and ends, the method comprising:
positioning at least two supports of a transport system on the bed of the transport device;
arranging at least one of the at least two supports at one of a plurality of support locations of the transport system in a lateral direction on the bed to accommodate the longitudinal length of the tower section;
affixing a flange of at least one of the at least two supports to one of the ends of the tower section;
accommodating differences in the circumference of the tower section along the longitudinal length of the tower section by:
adjusting a lateral separation between longitudinal pivots disposed on opposing cradle saddles, the opposing cradle saddles being movable in a lateral direction on at least one of the at least two supports relative to the circumference of a portion of the tower section, the opposing cradle saddles having pivoting cradle surfaces being pivotable about the longitudinal pivots and being configured to support the circumference of the portion of the tower section thereon, wherein the opposing cradle saddles are attached to a base component of the at least one of the at least two supports; and
allowing the pivoting cradle surfaces to pivot in a radial direction about the longitudinal pivots, wherein the longitudinal pivots are attached to the opposing cradle saddles without attaching to the base component of the at least one of the at least two supports.

11. The method of claim 10, wherein positioning the at least one of the two supports at the one of the plurality of support locations of the transport system on the bed comprises affixing a rail longitudinally on the bed and adjustably affixing the at least one of the two supports at a longitudinal position on the rail.

12. The method of claim 11, wherein the at least one of the two supports adjustably affixed on the rail has the flange.

13. The method of claim 10, wherein positioning the at least one of the two supports at one of the plurality of support locations of the transport system on the bed comprises affixing fixtures on the bed of the transport device and removably affixing the at least one of the two supports to the fixtures.

14. The method of claim 13, wherein affixing the fixtures on the bed of the transport device comprises affixing sets of tabs on the bed of the transport device, the sets of tabs being configured to restrain the at least one of the at least two supports affixed thereto at least laterally and longitudinally on the bed.

15. The method of claim 14, wherein removably affixing the at least one of the two supports to the fixtures comprises bolting portions of the at least one of the two supports with fasteners to the fixtures.

16. The method of claim 10, further comprising attaching at least one anchor to one of the ends of the tower section; and connecting the at least one anchor by at least one line to the transport device.

17. The method of claim 10, comprising lashing the tower section to at least one of the two supports.

18. The method of claim 10, wherein adjusting the lateral separation between longitudinal pivots disposed on the opposing cradle saddles movable in the lateral direction on the at least one of the two supports relative to the circumference of the portion of the tower section comprises adjusting lateral positions of the opposing cradle saddles on the at least one of the two supports; and supporting the adjusted positions of the opposing cradle saddles.

19. The method of claim 18, wherein supporting the adjusted positions of the opposing cradle saddles comprises affixing the opposing cradle saddles to a portion of the at least one of the two supports.

20. The method of claim 10, wherein allowing the pivoting cradle surfaces to pivot in the radial direction about the longitudinal pivots comprises angling the pivoting cradle surfaces attached on hinges to the opposing cradle saddles.

21. The method of claim 10, wherein the at least one of the two supports having the opposing cradle saddles comprises the at least one of the two supports having the flange affixing to the end of the tower section.

22. The method of claim 10, wherein the at least one of the two supports having the opposing cradle saddles comprises the at least one of the two supports supporting an intermediate portion of the tower section.

23. A method of transporting a tower section of a wind turbine on a bed of a transport device, the tower section having a longitudinal length, a circumference, and ends, the method comprising:
positioning a plurality of supports of a transport system on the bed of the transport device;
arranging at least one of the supports at one of a plurality of support locations of the transport system on the bed to accommodate the longitudinal length of the tower section;
affixing at least one the supports to one of the ends of the tower section;
accommodating differences in the circumference of the tower section along the longitudinal length of the tower section by:
adjusting a lateral separation between longitudinal pivots disposed on opposing cradle saddles, the opposing cradle saddles being movable in a lateral direction on at least one of the supports relative to the circumference of a portion of the tower section, the opposing cradle saddles having pivoting cradle surfaces being pivotable about the longitudinal pivots and being configured to support the circumference of the portion of the tower section thereon, wherein the opposing cradle saddles are attached to a base component of the at least one of the supports; and
allowing the pivoting cradle surfaces to pivot in a radial direction about the longitudinal pivots, wherein the longitudinal pivots are attached to the opposing cradle saddles without attaching to the base component of the at least one of the supports.

24. The method of claim 23, wherein the at least one the supports arranged at the one of the plurality of support locations is an end support configured to support the end of the tower section; and wherein arranging the end support at the one of the plurality of support locations of the transport system on the bed comprises affixing a rail longitudinally on the bed; and adjustably affixing the end support at a longitudinal position on the rail.

25. The method of claim 23, wherein the at least one the supports affixed to one of the ends of the tower section is an end support configured to support the end of the tower section; and wherein affixing the end support to the end of the tower section comprises affixing a flange of the end support to the end of the tower section.

26. The method of claim 23, wherein the at least one the supports arranged at the one of the plurality of support locations is an intermediate support configured to support an intermediate portion of the tower section; and wherein arranging the intermediate support at the one of the plurality of support locations of the transport system on the bed comprises affixing fixtures on the bed of the transport device; and removably affixing the intermediate supports to the fixtures.

27. The method of claim 23, wherein the at least one of the supports having the cradle saddles is an intermediate support configured to support an intermediate portion of the tower section; and wherein adjusting the separation between the opposing cradle saddles movable on the intermediate support comprises adjusting positions of the opposing cradle saddles on the intermediate support; and supporting the adjusted positions of the opposing saddles.

28. The method of claim 27, wherein supporting the adjusted positions of the opposing cradle saddles comprises affixing the opposing cradles saddles to a portion of the intermediate support.

29. The method of claim 23, wherein allowing the pivoting cradle surfaces to pivot in the radial direction about the longitudinal pivots comprises angling the pivoting cradles surfaces attached on hinges to the opposing cradle saddles.

30. The method of claim 23, further comprising:
attaching at least one anchor to one of the ends of the tower section, and connecting the at least one anchor by at least one line to the transport device; and
lashing the tower section to at least one of the supports.

31. The method of claim 1, wherein adjusting the lateral separation between longitudinal pivots disposed on the opposing cradle saddles comprises adjusting lateral positions of the opposing cradle saddles on the at least one of the intermediate support; and supporting the adjusted positions of the opposing cradle saddles.

32. The method of claim 31, wherein supporting the adjusted positions of the opposing cradle saddles comprises affixing the opposing cradle saddles to a portion of the at least one intermediate support.

33. The method of claim 1, wherein allowing the pivoting cradle surfaces to pivot in the radial direction about the longitudinal pivots comprises angling the pivoting cradle surfaces attached on hinges to the opposing cradle saddles.

* * * * *